(12) United States Patent
Suresh

(10) Patent No.: US 7,870,317 B2
(45) Date of Patent: Jan. 11, 2011

(54) STORAGE PROCESSOR FOR HANDLING DISPARATE REQUESTS TO TRANSMIT IN A STORAGE APPLIANCE

(75) Inventor: Tanjore Suresh, Fremont, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 719 days.

(21) Appl. No.: 11/229,741

(22) Filed: Sep. 19, 2005

(65) Prior Publication Data
US 2006/0248292 A1 Nov. 2, 2006

Related U.S. Application Data

(60) Provisional application No. 60/676,550, filed on Apr. 29, 2005.

(51) Int. Cl.
G06F 13/12 (2006.01)
G06F 13/28 (2006.01)
G06F 13/00 (2006.01)

(52) U.S. Cl. .......................... 710/74; 711/154; 711/165
(58) Field of Classification Search ................... 710/74; 711/154, 165
See application file for complete search history.

(56) References Cited

U.S. PATENT DOCUMENTS

| | | | | |
|---|---|---|---|---|
| 5,568,629 | A | 10/1996 | Gentry et al. | 711/173 |
| 5,889,934 | A | 3/1999 | Peterson | 714/6 |
| 6,438,664 | B1* | 8/2002 | McGrath et al. | 711/154 |
| 6,631,135 | B1* | 10/2003 | Wojcik | 370/395.21 |
| 7,127,577 | B2 | 10/2006 | Koning et al. | 709/203 |
| 7,228,380 | B2* | 6/2007 | Yamamoto et al. | 711/113 |
| 7,237,021 | B2 | 6/2007 | Penny et al. | 711/112 |
| 2005/0117522 | A1* | 6/2005 | Basavaiah et al. | 370/252 |
| 2005/0281261 | A1* | 12/2005 | Zur et al. | 370/389 |
| 2006/0221985 | A1* | 10/2006 | Mishra | 370/401 |
| 2007/0156974 | A1* | 7/2007 | Haynes et al. | 711/147 |

OTHER PUBLICATIONS

J.Satran et al., Internet Small Computer Systems Interface (iSCSI), http://www.ietf.org/rfc/rfc3720.txt, Apr. 2004.
Serial Attached SCSI, Comparison to Fibre Channel with FCP, Rob Elliott, HP Invent, Sep. 30, 2003.

(Continued)

*Primary Examiner*—Henry W Tsai
*Assistant Examiner*—Tushar S Shah
(74) *Attorney, Agent, or Firm*—Blakely, Sokoloff, Taylor & Zafman LLP

(57) ABSTRACT

A storage processor is interposed between initiators and storage targets, such as storage appliances or storage devices in a storage network. The storage processor presents a target interface to the initiators and an initiator interface to the targets, and the storage processor transparently intercepts and processes commands, data and/or status information (such as iSCSI R2T and data PDUs) sent between the initiators and the targets. The storage processor presents a virtual device to the initiators and transparently implements the virtual device on the targets, such as a RAID-1. The storage processor negotiates acceptable operational parameters, such as maximum segment size, with the initiators and targets, such that the storage processor can pass data received from the initiators to the targets, without excessive data buffering. Consequently, when an initiator issues a write command, the storage processor is able to forward each segment of data received from the initiator to the appropriate target(s), without first buffering all segments of the write command.

31 Claims, 17 Drawing Sheets

OTHER PUBLICATIONS

Jin, Guojun et al. "Netest: A Tool to Measure the Maximum Burst Size, Available Bandwidth and Achievable Throughput," IEEE International Conference on Information Technology: Research and Education (ITRE2003), Newark, New Jersey, USA, Aug. 11-13, 2003, 5 pages.

* cited by examiner

Mapping Table

| LUN | Mapping Type |
|---|---|
|  |  |
|  |  |
|  |  |
| ⋮ | ⋮ |

State Information Data Structure

| Session ID |
| --- |
| Connection ID |
| Initiator Task Tag |
| Target Task Tag |
| Command Seq. Number |
| CDB (16 bytes) |
| LUN |
| Flags (Initiator / Target and state info Valid / Invalid) |
| Virtual Type |
| Number of Mirrors |
| Data Length |
| Number of Pending R2Ts |
| R2Ts info Array [MaxOutstandingR2T] |
| Mirror Command Info Array [MaxMirrors] |
| Number of Response PDUs Needed |

*Fig. 15*

R2T Info Data Structure

Mirror Command Info Data Structure

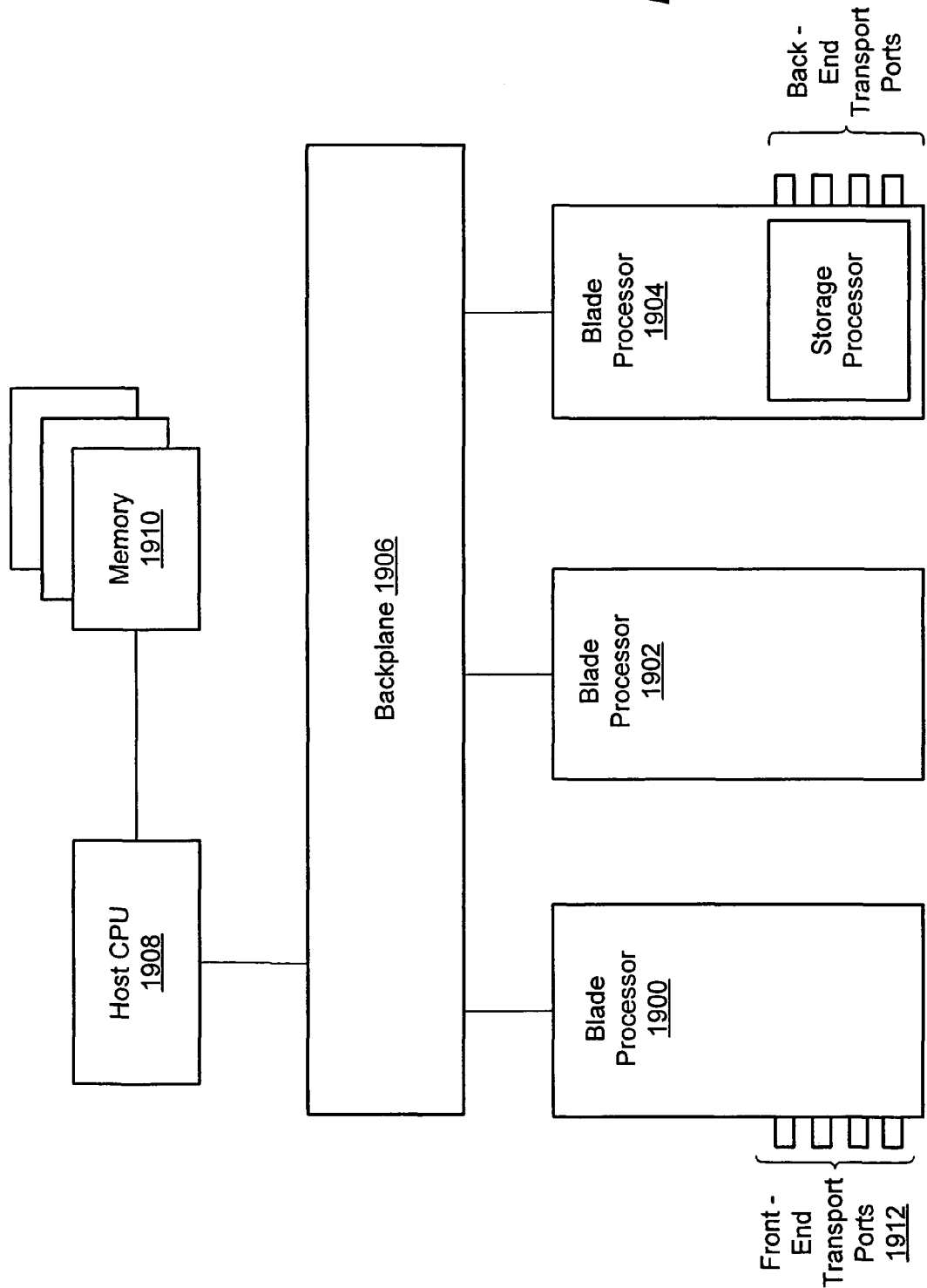

STORAGE PROCESSOR FOR HANDLING DISPARATE REQUESTS TO TRANSMIT IN A STORAGE APPLIANCE

CROSS REFERENCE TO RELATED APPLICATIONS

This application claims the benefit of U.S. Provisional Patent Application No. 60/676,550, titled "STORAGE PROCESSOR FOR HANDLING DISPARATE REQUESTS TO TRANSMIT (R2TS) IN AN ISCSI APPLIANCE," filed Apr. 29, 2005.

STATEMENT REGARDING FEDERALLY SPONSORED RESEARCH OR DEVELOPMENT (Not applicable)

BACKGROUND OF THE INVENTION

The present invention relates to computer storage networks and, more particularly, to storage processors that intercept and process storage commands and data sent between initiators and targets.

Computer workstations, application servers or other computers (collectively hereinafter referred to as "initiators") frequently access data that is stored remotely from the initiators. In these cases, computer networks are used to connect the initiators to storage devices (such as disks) that store the data. For example, Information Systems (IS) departments frequently maintain "disk farms," tape backup facilities and magnetic, optical and other storage devices (sometimes referred to as media) in one or more central locations and provide access to these storage devices via computer networks. This centralized storage enables data stored on the storage devices to be shared by many initiators scattered throughout an organization. Such an arrangement also enables the IS departments to store the data in secure, controlled environments on highly reliable (sometimes redundant) equipment, so the data remains available, even in case of a catastrophic failure of one or more of the storage devices. Centralized data storage also facilitates making frequent backup copies of the data and providing access to backed-up data, when necessary.

Specialized computers (variously referred to as file servers, storage servers, filers, etc., collectively hereinafter referred to as "storage appliances") located in the centralized locations make the data on the storage devices available to the initiators. Software in the storage appliances and other software in the initiators cooperate to make the central storage devices appear to users and application programs as though the storage devices are locally connected to the initiators.

In addition, the storage appliances can perform services that are not visible to the initiators. For example, a storage appliance can redundantly store data on a set of storage devices, such as on a Redundant Array of Inexpensive (or Independent) Disks (RAID). Several levels of RAID are available, including disk mirroring, which is commonly referred to as RAID-1. The storage appliance provides an interface that appears to the initiators to be to an actual storage device. However, the apparent storage device does not exist. Instead, the storage appliance accepts input/output commands directed to the apparent storage device (referred to as a "virtual device"), and the storage appliance performs input/output operations on one or more actual storage devices to satisfy the commands to the virtual device.

For example, when the initiator writes data to a virtual device that is implemented as a RAID-1, the storage appliance writes the data to all the applicable members of the RAID-1. Once all the actual write operations complete successfully, the storage appliance returns a successful status indicator to the initiator. The initiator remains unaware that the data has been stored on multiple actual storage devices. When the initiator reads from the virtual device, the storage appliance reads data from the applicable member(s) of the RAID and sends the data to the initiator. If one member of the RAID fails, the storage appliance uses the remaining members of the RAID to continue satisfying read and write commands from the initiator until (optionally) the failed RAID member is replaced.

The Small Computer System Interface (SCSI) protocol defines electrical characteristics of a cable (a parallel SCSI bus) and a set of commands and responses that can be sent over the SCSI bus or over a serial interconnect, according to which a computer (sometimes referred to as a host) can control storage and other types of devices. Fibre Channel (FC) defines characteristics of high-performance optical and electrical cables and a multi-level control protocol that can be used to interconnect a pair of devices to each other in a point-to-point connection, a small number (up to 127) of devices in an "arbitrated loop" or a large number (up to 2**24) of devices in a "fabric." Such a fabric is similar to a computer network and typically includes one or more switches, similar to switches found in computer networks.

In some cases, storage devices are connected to storage appliances via dedicated, high-performance computer networks, commonly referred to as Storage Area Networks (SANs). Fibre Channel technology is commonly used to interconnect storage devices and storage appliances in SANs.

More recently, a protocol known as iSCSI (Internet SCSI) has been used to exchange SCSI commands and data over packet-switched networks (typically Internet Protocol (IP) networks), such as local area networks (LANs) and the Internet. iSCSI Protocol Data Units (PDUs) are used to encapsulate and reliably deliver SCSI Command Descriptor Blocks (CDBs), data and status over a packet-switched network. These PDUs are exchanged between initiators and storage appliances or between initiators and iSCSI storage devices that are connected to the network. In storage parlance, an initiator communicates with a "target," which performs the requested operation. For example, storage appliances and iSCSI storage devices that are connected to IP networks are referred to as targets.

As noted, a storage appliance is typically connected to one or more initiators via an IP network or an IP fabric. To facilitate this network connection, the storage appliance includes one or more network interfaces that handle transmission and reception of signals over a medium, such as a twisted pair of wires, and optical fiber or over a wireless link. If the storage appliance is also connected to a SAN, the storage appliance includes one or more network or port interfaces that are connected to the fabric of the SAN. The storage appliance also includes at least one processor to control operation of the storage appliance and memory to store a control program and operating parameters and to buffer data.

When data is to be written to a virtual storage device, and a target (typically a storage appliance) that implements the virtual storage device performs some storage service that involves more than one actual storage device, such as implementing a RAID, the storage appliance buffers the write data until all the write operations on all the applicable storage devices complete. However, if the storage devices that make up a virtual device (such as a RAID) are made by different manufacturers or have different operating characteristics, the maximum amount of data each actual storage device can accept at one time (the "maximum segment size") and the maximum amount of data the storage device can accept in a series of segments (the "maximum burst size") can vary from storage device to storage device. Other parameters can also vary among the storage devices.

Each storage device indicates to the storage appliance the maximum segment size and the maximum burst size it is able to handle. For example, a lightly loaded storage device might have more local buffer space available than a heavily loaded storage device. Thus, the lightly loaded device can indicate that it is able to handle larger segment and burst sizes than the heavily loaded storage device indicates. Storage devices made by disparate manufacturers can indicate disparate maximum segment and burst sizes, as well as other parameters, whose values are different among a set of storage devices, even under identical load conditions. To accommodate these various maximum segment and burst sizes, the storage appliance receives and buffers all the data of the write operation from the initiator before beginning to write to any of the actual storage devices. After all the data is received, the storage appliance performs various-sized write operations to each of the actual storage devices, according to their respective maximum segment sizes, burst sizes, etc.

Buffering this data involves copying the data, as it is received by the storage appliance, from the network interface into the memory of the storage appliance. Writing each segment of data to an actual storage device involves copying some of the data out of the memory to a network or fabric interface. Copying the data into, then out of, the memory takes time, thus copying the data increases the amount of time before the storage appliance can report completion to the initiator (such as in a synchronous mirroring RAID-1 system), and decreases the apparent speed of the virtual storage device, from the viewpoint of the initiator.

Furthermore, the storage appliance must include enough memory to buffer all the simultaneous write operations that it performs on behalf of the initiators. Storage appliances typically handle many concurrent write operations for many initiators. Providing memory to buffer these write operations is expensive. If sufficient memory is not available in the storage appliance to handle a given write operation to a virtual device, the initiator must wait until a previously requested write operation completes and sufficient memory becomes available, thereby delaying the initiator.

Thus, prior art storage appliances require large amounts of memory to buffer data, and I/O operations performed through these storage appliances exhibit high latency times due to the large amount of data that must be moved into and out of the memory.

BRIEF SUMMARY OF THE INVENTION

A storage processor complex and a method are disclosed for handling write operations to virtual storage devices, without requiring all the data of each such write operation to be received and buffered before beginning to write the data to actual storage devices, thus reducing memory requirements in storage appliances and reducing the amount of time taken to complete the virtual write operations. In one implementation, the storage processor complex is interposed between initiators and storage appliances or between initiators and storage devices that are connected to a network. For example, the storage processor complex can be included in a switch in a network between the initiators and the storage appliances. Alternatively, the storage processor complex can be included in a storage appliance, in a storage device that is connected to a network, in a workstation or application server or elsewhere between an application executing on an initiator and a storage device. For simplicity, the storage processor complex will be described as being interposed between initiators and storage appliances.

The storage processor complex presents a target interface to the initiators, and it presents an initiator interface to the storage appliances. Thus, the storage processor complex appears to an initiator as a target, i.e., the storage processor complex appears as a storage device; and the storage processor complex appears to storage appliances as an initiator. In this position between the initiators and the storage appliances, the storage processor complex can transparently (i.e., invisibly to the initiators) intercept and process commands, data and/or status information sent between the initiators and the storage appliances. In addition, the storage processor complex can present many virtual devices to the initiators and transparently implement each of the virtual devices on a set of actual storage devices, such as a RAID. In other examples, the storage processor complex simply distributes the data of the virtual device across a set of non-redundant storage devices or performs some other high-level storage function.

Furthermore, the storage processor complex can collect operational parameters from the initiators and from the storage appliances and present calculated operational parameters to the initiators and to the storage appliances, such that the parameters are acceptable to all the initiators and all the involved storage appliances. The storage processor complex calculates the operational parameters presented to the initiators and to the storage appliances such that the storage processor complex can pass data it receives from the initiators to the storage appliances, without excessive data buffering.

For example, the storage processor complex collects operational parameters that indicate the maximum segment sizes and the maximum burst sizes the storage appliances can accept. Then, the storage processor complex selects the smallest of each of these values (or yet smaller values, depending on the amount of free memory or other resources available in the storage processor complex or based on parameters from initiators) and provides these calculated values to the initiators. Consequently, when an initiator issues a write command, the storage processor complex is able to forward each segment of data it receives from the initiator to the appropriate storage appliance(s), without first buffering all the segments of the input/output (I/O) operation.

A relatively small amount of memory is required to buffer one segment, compared to the amount of memory that would be required to buffer all the segments of the I/O operation. Consequently, the storage processor complex has relatively modest memory requirements. Furthermore, this memory can be located close (in terms of bus architecture) to the network interfaces and/or fabric interfaces of the storage processor complex. Consequently, the segment data can be moved to and from the memory quickly. In addition, flow control mechanisms defined by the protocols used by the network or fabric interfaces can be used to regulate the flow of data from or to the initiators and the targets.

Additionally, a different protocol can be used for communications between the initiators and the storage processor complex than for communications between the storage processor and the targets.

These and other features, advantages, aspects and embodiments of the present invention will become more apparent to those skilled in the art from the Detailed Description of the Invention that follows.

BRIEF DESCRIPTION OF THE SEVERAL VIEWS OF THE DRAWINGS

The invention will be more fully understood by referring to the Detailed Description of the Invention in conjunction with the Drawings, of which:

FIG. 15 is a diagram of one of the State Information data structure elements of the array shown in FIG. 14;

FIG. 19 is a block diagram of another storage appliance, according to one embodiment of the present invention.

DETAILED DESCRIPTION OF THE INVENTION

The contents of U.S. Provisional Patent Application No. 60/676,550, titled "STORAGE PROCESSOR FOR HANDLING DISPARATE REQUESTS TO TRANSMIT (R2TS) IN AN ISCSI APPLIANCE," filed Apr. 29, 2005, are hereby incorporated by reference herein.

A storage processor complex and a method are disclosed for handling write operations to real or virtual devices, without requiring all the data of each such write operation to be received and buffered before beginning to write the data to actual storage devices. In one implementation, the storage processor complex is interposed between initiators and storage appliances or between initiators and storage devices that are connected to a network. Before providing a detailed description of the storage processor complex and related methods, the following background information concerning storage networks and the communication protocols are provided.

Storage Networks and iSCSI Protocol

Figure 1:
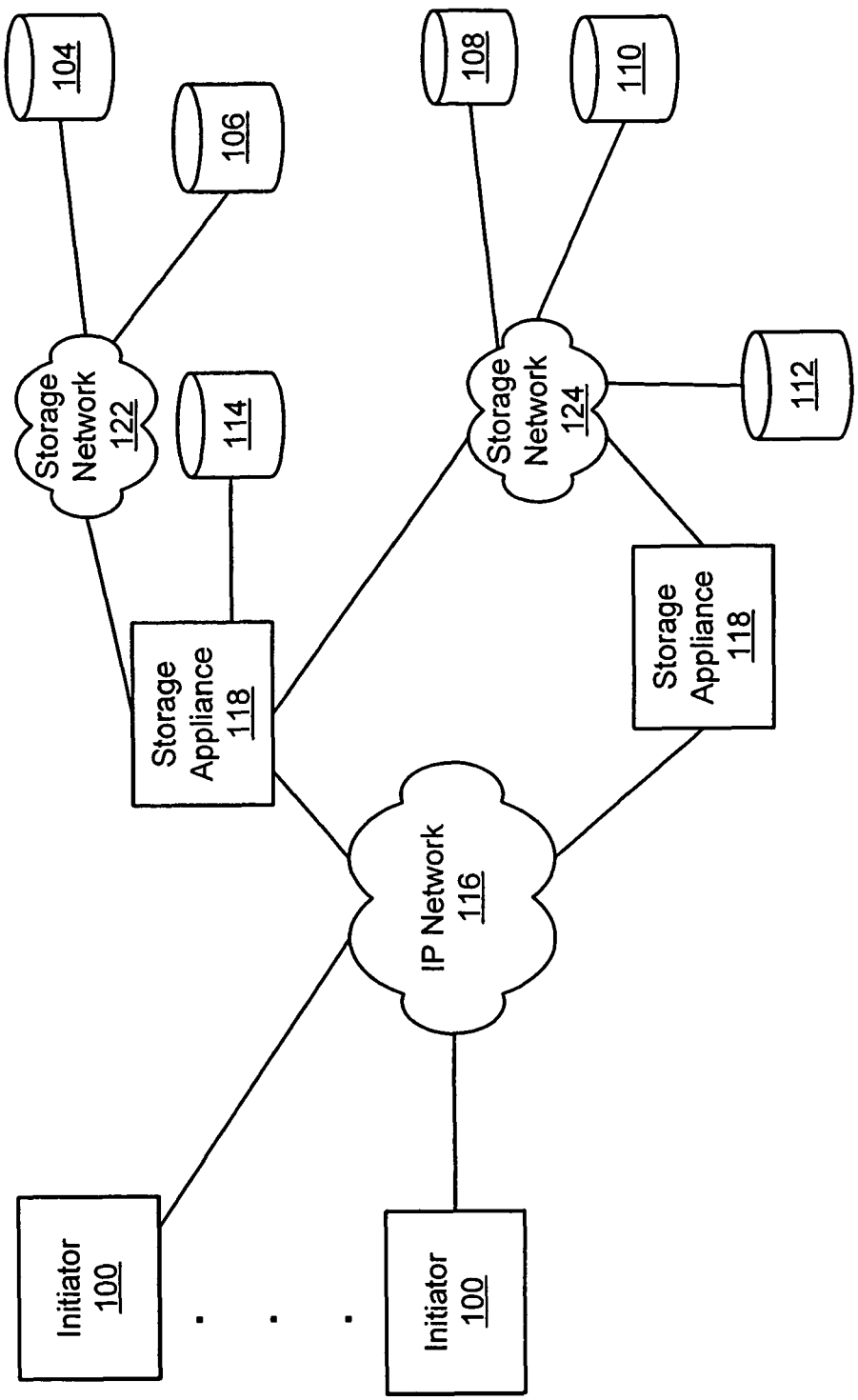
FIG. 1 is block diagram of a prior-art storage architecture, including an Internet protocol (IP) network and a storage network.

As noted, workstations, application servers or other computers (collectively "initiators") are frequently connected to storage appliances and/or storage devices via local or wide area networks (LANs or WANs) and/or storage networks. FIG. 1 is a block diagram of an exemplary prior-art storage architecture. Initiators 100 are connected to storage devices 104-114 via a packet-switched (such as in Internet Protocol (IP)) network 116 and two storage appliances 118. The storage appliances 118 are interconnected to the storage devices 104-114 via storage networks 122 and 124. Fibre Channel or other technology can be used to implement the storage networks 122 and 124, as is well-known in the art. iSCSI or other protocols can be used to communicate between the initiators 100 and the storage appliances 118, as is well-known in the art.

Figure 2:
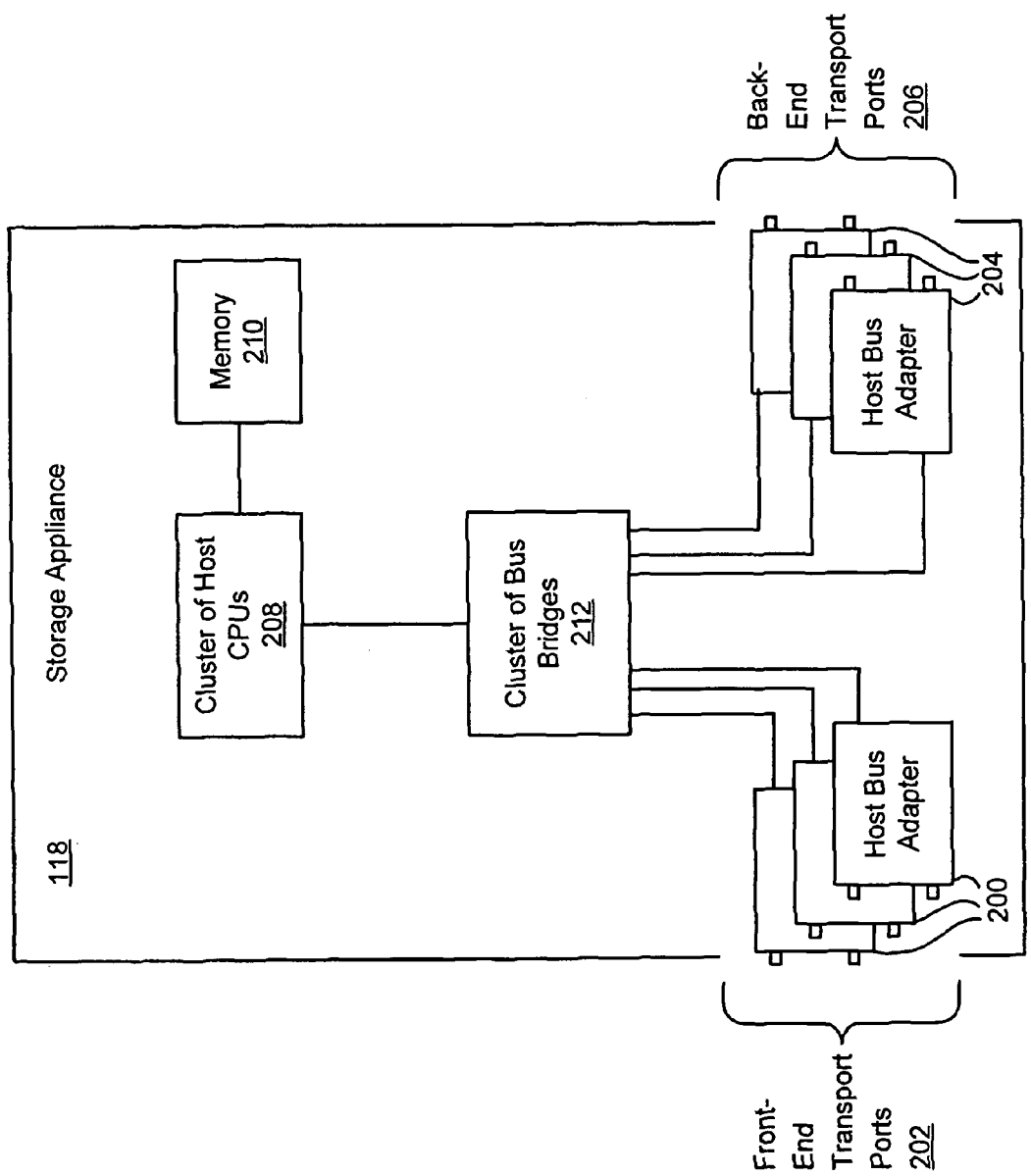
FIG. 2 is a block diagram of a prior-art storage appliance of FIG. 1.

FIG. 2 is a block diagram of one of the prior-art storage appliances 118 of FIG. 1. The storage appliance 118 includes one or more host bus adapters 200 (or other suitable network adapters), which provide front-end transport ports 202. An initiator 100 communicates, via the packet-switched network 116, with the storage appliance 118 by establishing a network connection to one or more of the front-end transport ports 202. For example, the initiator 100 can include a similar host bus adapter or network interface (not shown).

The storage appliance 118 also includes one or more host bus adapters 204 (or other suitable fabric or network adapters), which provide back-end transport ports 206, by which the storage appliance 118 communicates, via the storage network 122 or 124, with one of the storage devices 104-112. Alternatively or in addition, the storage appliance 118 can be connected to one or more storage devices 114 without a network.

A cluster of one or more host processors (CPUs) 208 controls the operation of the storage appliance 118. The host processors 208 execute instructions stored in a memory 210 and communicate with the host bus adapters 200 and 204 via a cluster of bus bridges 212. The memory 210 is also used to buffer data. As data messages are received from an initiator 100 by one of the host bus adapters 200, the data is copied, via the cluster of bus bridges 212, to the memory 210. In some implementations, all or part of the memory 210 is battery-backed up, non -volatile, random access memory (NVRAM).

Once all the data of the write operation has been received and buffered in the memory 210, the storage appliance 118 begins sending data messages to the storage devices 104-112. The storage appliance 118 breaks the write data into segments. The storage appliance 118 sends each segment in a separate data message. The sent segments preferably are the same size as the segments the storage appliance 118 received from the initiator 100. To send each of these data messages, an appropriate amount of data is copied from the memory 210, via the cluster of bridges 212, to the appropriate host bus adapter 204, for transmission over the appropriate back -end transport port 206. The movement of data to and from the memory 210 consumes time and slows the I/O operation, as previously discussed. In addition, the memory 210 must be large enough to buffer all the data of all the simultaneous I/O operations being processed by the storage appliance 118.

Figure 3:
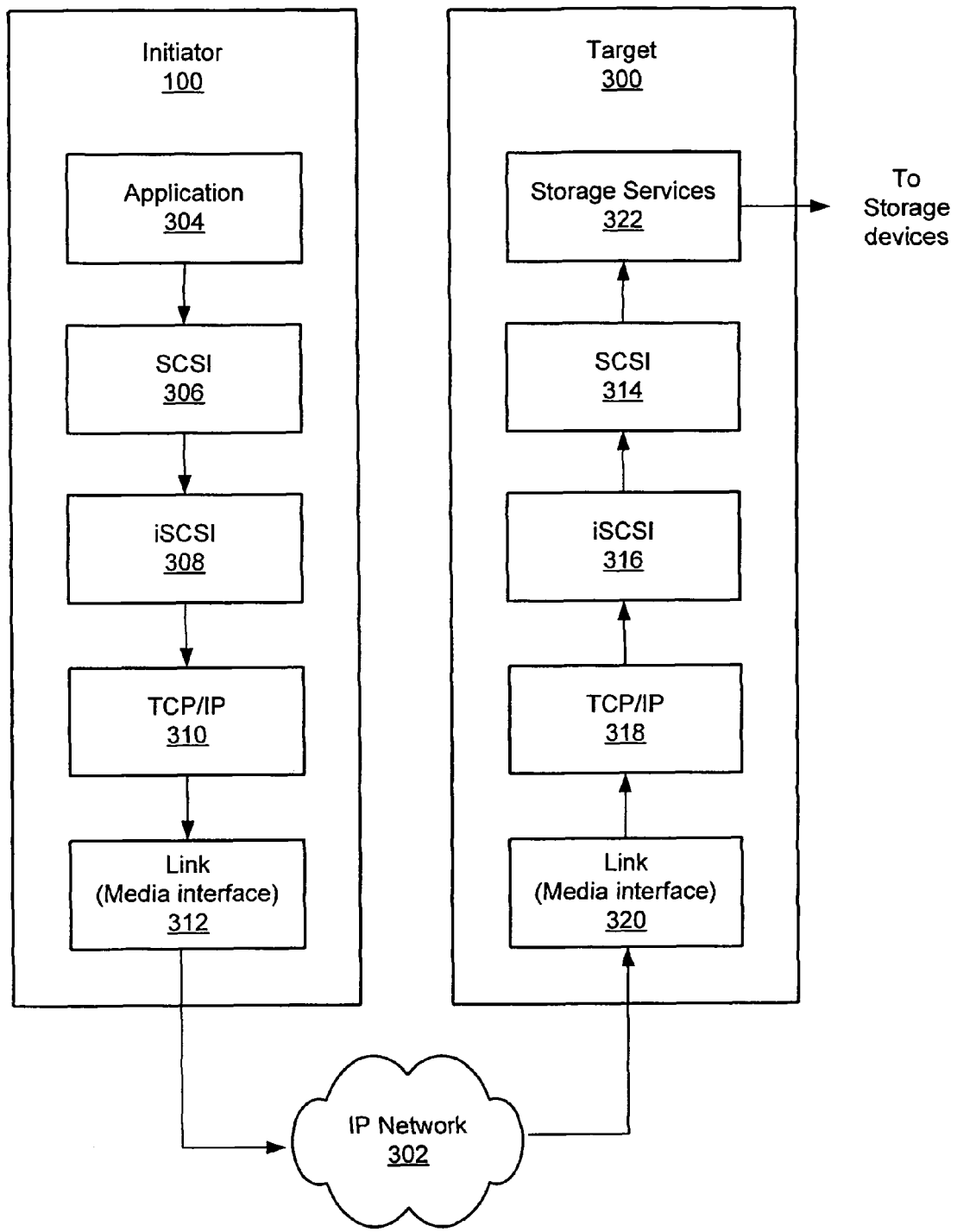
FIG. 3 is a block diagram of iSCSI protocol layers of an initiator and a target, according to the prior art.

Software in the storage appliance 118 and other software in the initiator 100 cooperate to make one or more of the storage devices 104-114, or portions thereof, appear to be locally connected to the initiator 100, as is well-known in the art. For example, as shown in FIG. 3, the iSCSI protocol can be used for communications between the initiator 100 and a target 300 (such as the storage appliance 118) over an Internet Protocol (IP) network 302. For example, an application 304 in the initiator 100 issues an I/O command. A SCSI layer 306 converts this I/O command to a series of SCSI commands and forwards the commands to an iSCSI protocol layer 308. The iSCSI protocol layer packages each SCSI command in an iSCSI Protocol Data Unit (PDU) with an optional cyclic redundancy check (CRC) (commonly referred to as a "Data Digest") and forwards the PDU to a TCP/IP layer 310. The TCP/IP layer 310 divides the iSCSI PDU into a series of network packets and sends the network packets reliably over the network 302. A link layer 312 handles transmission and reception of the network packets over a physical medium, such as a twisted pair of wires. iSCSI is described in RFC 3720, which is available at http://www.faqs.org/rfcs/rfc3720.html, the contents of which are hereby incorporated by reference herein.

Figure 4:
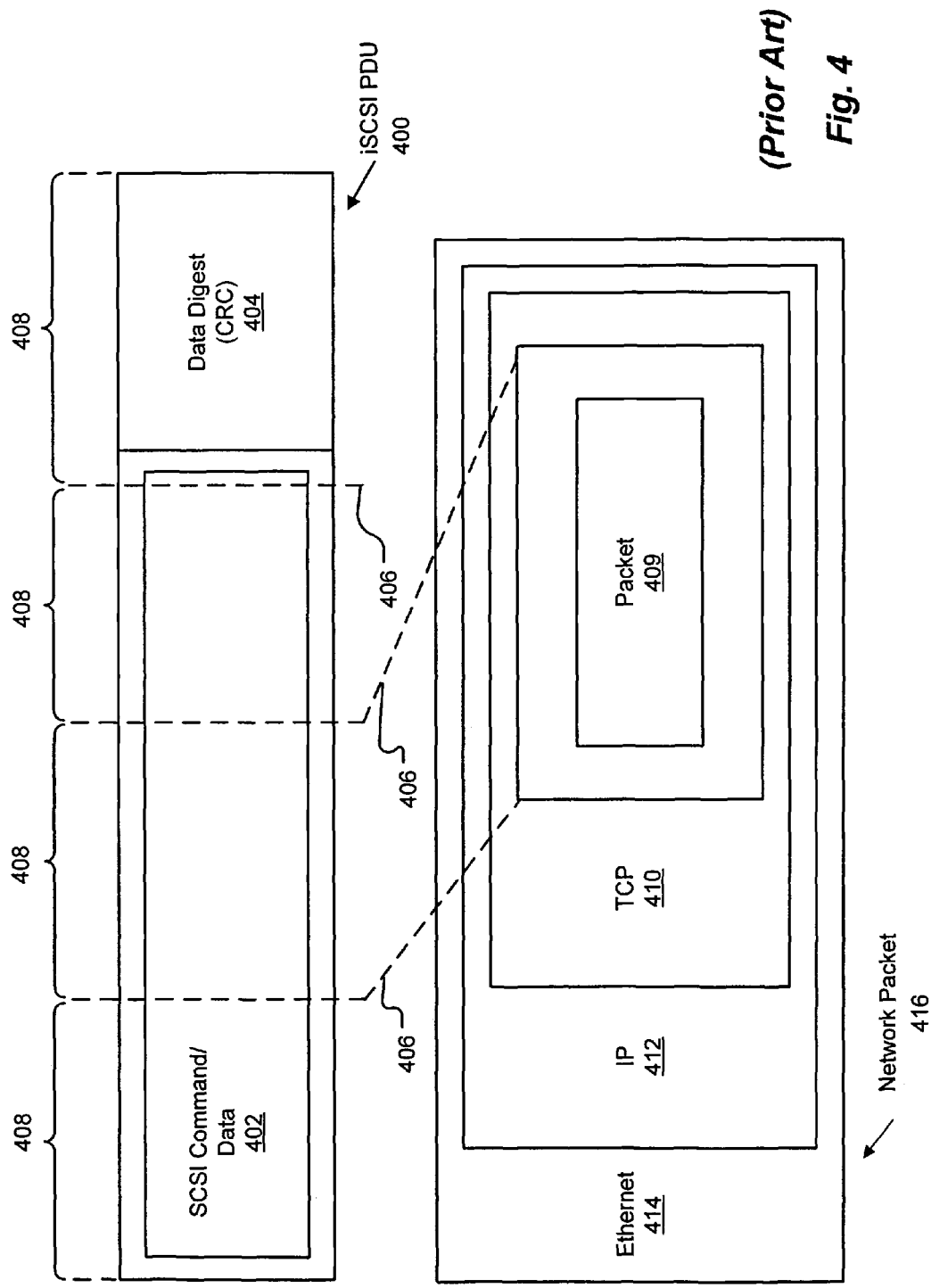
FIG. 4 is a block diagram of an iSCSI Protocol Data Unit (PDU), such as those used by the initiator and target of FIG. 3, according to the prior art.

FIG. 4 is a block diagram of an iSCSI PDU 400, including a SCSI command or data 402 and a Data Digest 404. As shown by dashed lines 406, the iSCSI PDU 400 is divided into packets 408. Each of the packets 408 is progressively encapsulated (as shown at 409) in a TCP packet 410, an IP packet 412 and an Ethernet packet 414 by the TCP/IP layer 310 and the link layer 312 (respectively) for transmission over the IP network 302. The resulting network packet 416 is transmitted by the link layer 312. Although not shown in FIG. 4, when the first or last packet 408 of the PDU 400 is encapsulated in the network packet 416, a portion of a preceding PDU or of a subsequent PDU can be included in the encapsulation 409, if the packet 408 does not occupy all of the available space in the network pocket 416.

Returning to FIG. 3, network packets 416 are received by a link layer 320 in the target 300. The iSCSI PDU 400 is reconstructed from the received network packets 416. The iSCSI PDU is processed by successively higher layers 314-320, which correspond to layers 306-312 in the initiator 100. Finally, the PDU is processed by a storage services module 322 in the target 300. The storage services module 322 accesses the actual storage device(s) 104-112 on behalf of the initiator 100. The storage services module 322 can also perform high-level I/O services, such as implementing a RAID on a plurality of actual storage devices.

Figure 5:
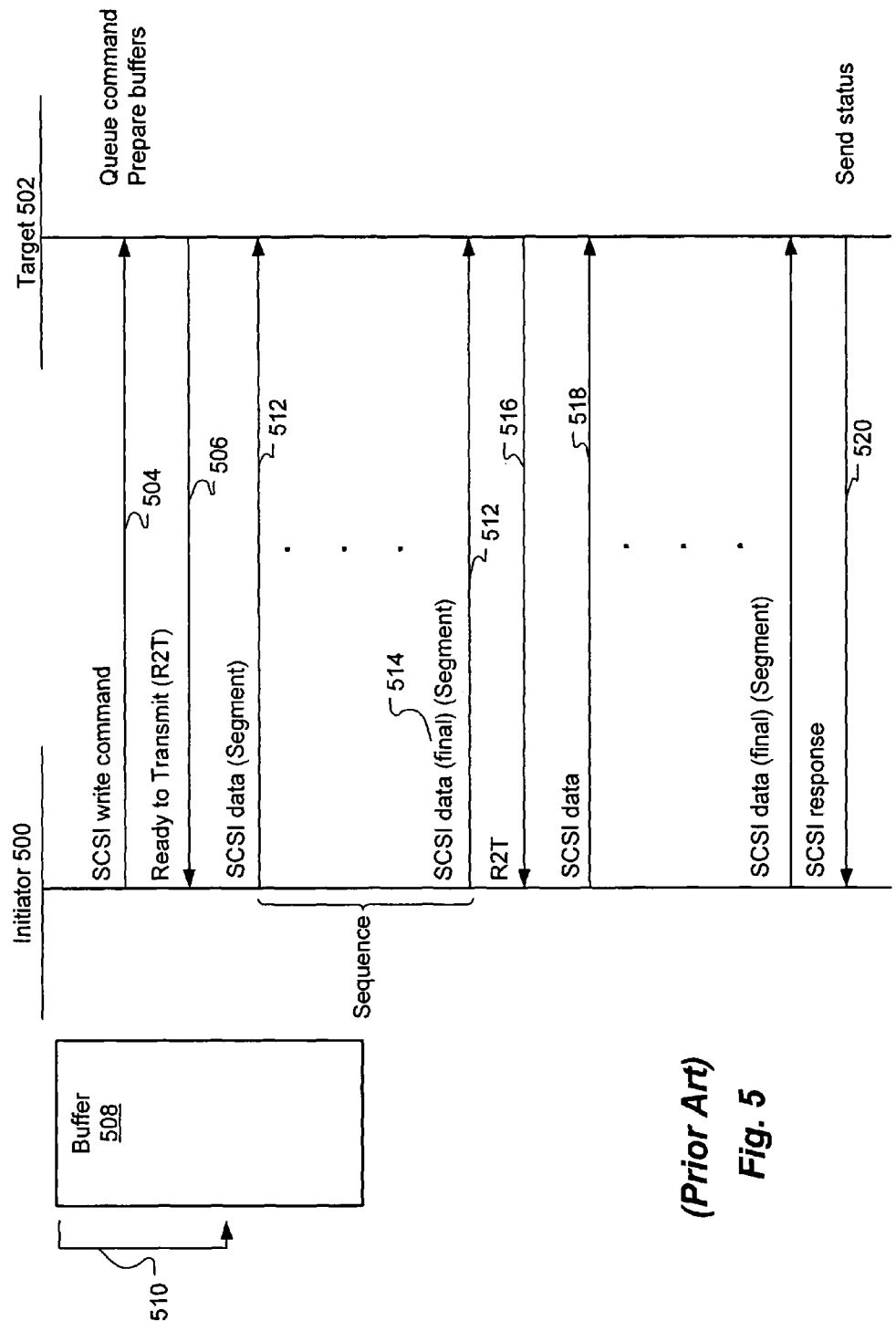
FIG. 5 is a ladder diagram illustrating interactions between an initiator and a target, according to the prior-art iSCSI protocol.

Thus, an initiator can send a SCSI command to a target, and the target can accept data from, or return data to, the initiator via a set of iSCSI PDUs that are sent between the initiator and the target. FIG. 5 is a ladder diagram illustrating interactions (i.e., PDUs sent) between an initiator 500 and a target 502 during a SCSI write command. The initiator 500 sends 504 a command PDU that includes a SCSI write command. The SCSI write command specifies an amount of data to be written.

When the target 502 is ready to accept data from the initiator 500, the target sends 506 a Ready to Transmit (R2T) PDU to the initiator. In the R2T, the target 502 specifies an amount of data the initiator 500 is to send. This amount can be less than the size of the I/O, because, for example, the target 502 may not have sufficient buffer space to receive all the I/O data at one time. In this case, the target 502 sends a series of R2Ts, as buffer space becomes available in the target. Each of these R2Ts includes a sequence number.

The initiator 500 maintains a buffer 508 that contains data to be written to the target. As noted, each R2T from the target 502 specifies the amount of data the initiator 500 is to send. Each R2T also specifies an offset (such as offset 510) into the buffer 508, where the data for the corresponding R2T begins.

In response to each R2T (such as the R2T sent at 506), the initiator 500 sends one or more data PDUs 512 to the target 502. Each of these data PDUs 512 contains successive data from the buffer 508, beginning at the offset 510 previously specified. Note that the initiator 500 can send the requested data in one or more data PDUs 512, at its option to satisfy one R2T. The data in each of the data PDUs 512 is referred to as a "segment," and the totality of the data sent in response to an R2T (i.e., all the segments 512) is referred to as a "sequence." To assist the target in identifying the data in each data PDU, each data PDU contains an "offset" field. The initiator 500 loads this field with an offset from the beginning of the buffer 508, to indicate where the data PDU's segment begins. The final data PDU 512 of the sequence includes a "final" flag 514.

In the example shown in FIG. 5, two R2Ts 506 and 516, and their corresponding data PDUs 512 and 518, are shown. In other examples, other numbers of R2Ts and data PDUs can be used. In the example shown in FIG. 5, the two R2Ts 506 and 516 and their respective data PDUs 512 and 518 are handled in succession, i.e., all the data PDUs 512 of the first R2T 506 are handled before the second R2T 516 is issued. However, multiple R2Ts can be simultaneously outstanding, and their respective data PDUs can be interleaved. The maximum number of simultaneous outstanding R2Ts is controlled by a parameter named MaxOutstandingR2T, which is negotiated between the initiator and the target before any iSCSI commands are issued. After the last data PDU 518 is successfully received by the target 502, the target returns 520 a successful status to the initiator in a status PDU.

Other Protocols

Fibre Channel (FC) is the general name of an integrated set of standards for communication between or among computers and I/O devices. FC connections can be made using various media, including optical fiber and copper wire. Several FC concepts are similar to corresponding iSCSI concepts. For example, FC uses basic data units (called Information Units (IUs)) in much the way iSCSI uses PDUs. FC defines command IUs and data IUs, which are analogous to iSCSI command PDUs and iSCSI data PDUs, respectively. FC uses "transfer ready" (XFER_RDY) IUs largely the way iSCSI uses R2Ts, except FC allows only one outstanding XFER_RDY at a time, whereas iSCSI allows multiple concurrent outstanding R2Ts. Both protocols include the concept of a maximum burst size, which is discussed in more detail below. Other similarities and differences between the protocols are also discussed below.

Serial Attached SCSI (SAS) is another protocol used for communication between computers and I/O devices. The basic data unit in SAS is a "frame." SAS defines command frames and data frames, which are analogous to iSCSI command PDUs and iSCSI data PDUs, respectively. For example, a SAS XFER_RDY command frame is analogous to an iSCSI R2T PDU.

Other protocols can also be used for communications between initiators and targets, as is well known in the art.

Storage Processor Complex

Figure 6:
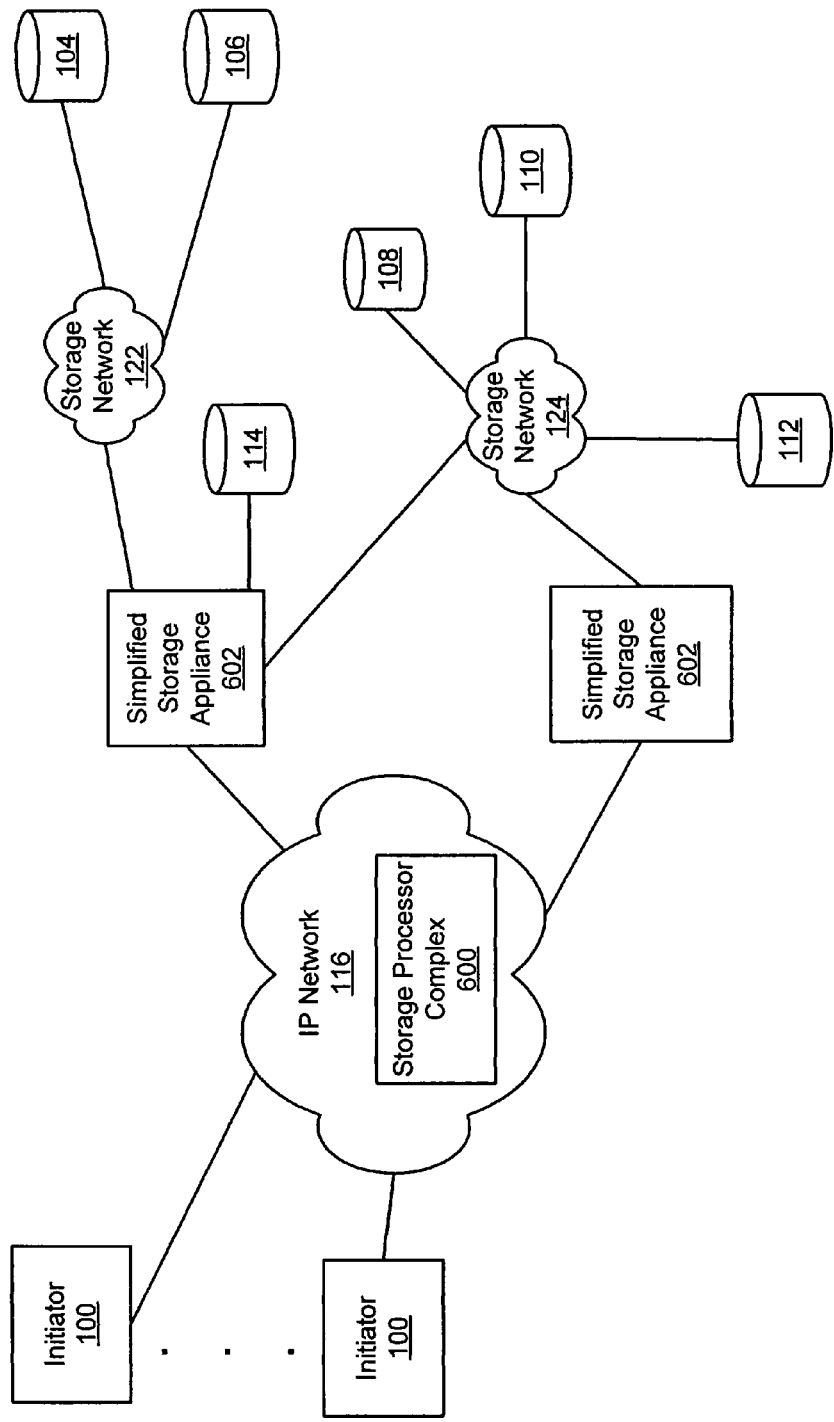
FIG. 6 a block diagram of a storage architecture, according to one embodiment of the present invention.

As noted, a storage processor complex of the present disclosure is disposed between an initiator and a target, so it can transparently (i.e., invisibly to the initiator) intercept and process commands, data and/or status information sent between the initiator and the target. FIG. 6 is a block diagram of an exemplary storage architecture that includes a storage processor complex 600. Initiators 100 access storage devices 104-114 via a packet-switched (such as an IP) network 116, (possibly simplified, as explained below) storage appliances 602 and storage networks 122 and 124. However, according to the present disclosure, the storage processor complex 600 is inserted in the communication path between the initiators 100 and the storage devices 104-114. In the example illustrated in FIG. 6, the storage processor complex 600 resides in the packet -switched network 116, such as within a switch, router, network cache or other network component (not shown). An example of such an embodiment is described below, with reference to FIG. 18. In other examples, the storage processor complex 600 is included in one or more of the initiators 100, in the (possibly simplified) storage appliances 602 or in the storage devices 104-114. An example of such an embodiment is described below, with reference to FIG. 19.

Figure 7:
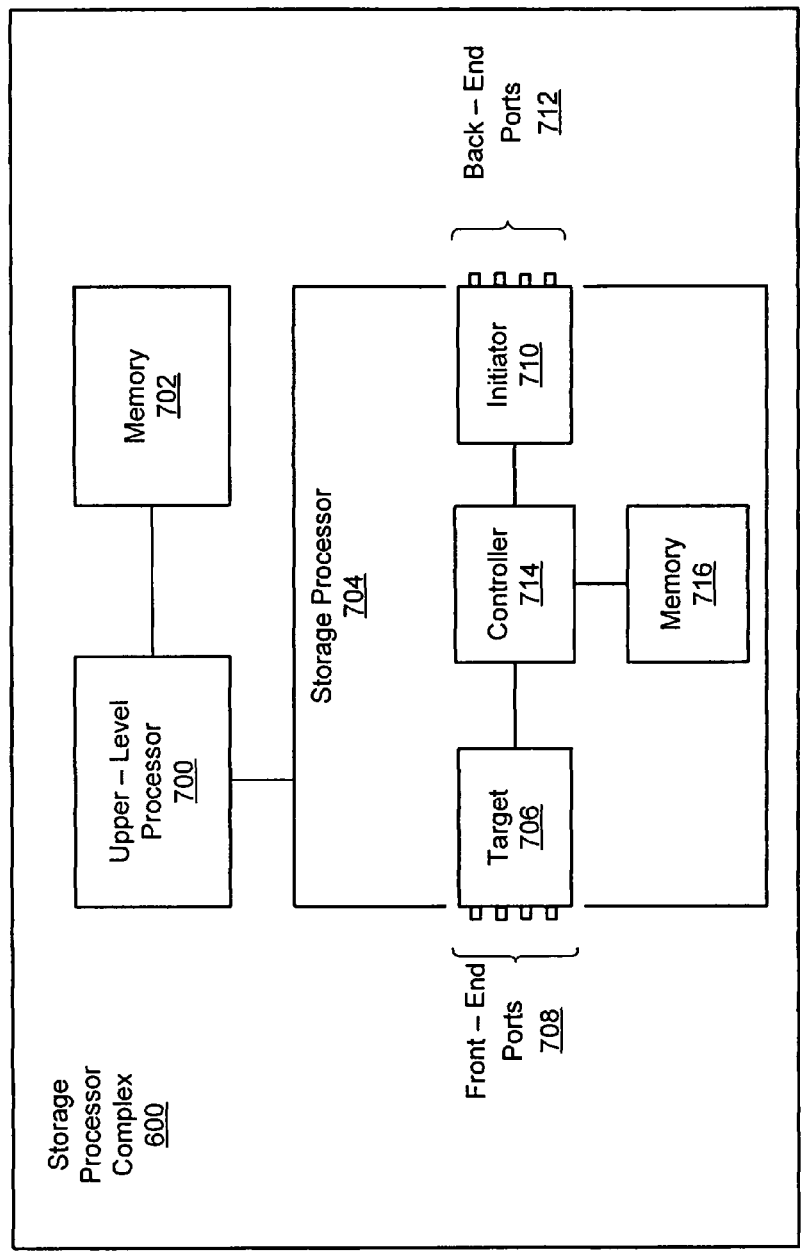
FIG. 7 is a block diagram of a storage processor complex of FIG. 6, according to one embodiment of the present invention.

In the storage architecture of FIG. 1, the initiators 100 communicate with the storage appliances 118 according to the iSCSI protocol or another network protocol. Thus, the storage appliances 118 appear as targets to the initiators 100. FIG. 7 is a block diagram of the storage processor complex 600. The storage processor complex 600 includes an upper-level processor 700, a memory 702 and a storage processor 704.

The storage processor 704 includes an implementation of one or more targets 706, which provide front-end ports 708, with which the initiators 100 can communicate. This communication is transparent, in that each target 706 presents one or more virtual storage devices to the initiators 100. Each front-end port 708 and each back-end port 712 has an associated IP address. iSCSI PDUs or other protocols' basic data units are typically carried by an underlying protocol and addressed to destination IP addresses. Optionally, one or more of the front-end and/or back-end ports 708 or 712 each has a plurality of associated IP addresses. In either case, a plurality of connections from one or more initiators can be terminated at each front-end port 708, and a plurality of connections to one or more targets can be terminated at each back-end port 712.

The storage processor 704 also includes an implementation of one or more initiators 710, which provide back-end ports 712, by which the storage processor can communicate with the storage appliances 602 and/or the storage devices 104-114. Each initiator 710 can initiate I/O operations on the storage appliances 602 and/or the storage devices 104-114.

The storage processor 704 also includes one or more controllers 714 (such as one or more central processing units (CPUs)) and at least one memory 716 to store a control program that controls operations of the storage processor and to buffer data. For example, under the control of the control program stored in the memory 716, the controller 714 provides high-level I/O services, such as presenting a single virtual device to the initiators 100 and transparently implementing the virtual device on a set of actual storage devices 104-114, such as a RAID-1. In particular, the controller 714 can cause the storage processor 704 to handle write operations to the virtual device without requiring all the data of each such write operation to be received and buffered before beginning to write the data to the actual storage device(s) 104-114.

The upper-level processor 700 controls operation of the storage processor 704, and the memory 702 stores a control program that is executed by the upper-level processor. Under the direction of the control program, the upper-level processor 700 controls, manages or directs operation of the storage processor 704 through a message passing mechanism or another known mechanism. In one embodiment, the storage processor complex 600 resides in the packet-switched network 116, such as within a switch. (Such an embodiment is described below, with reference to FIG. 18.) The upper-level processor 700 can be dedicated to the storage processor 704, or the upper-level processor can be one or more of the processors that control(s) operation of the switch.

The upper-level processor 700 controls the storage processor 704 and performs higher level I/O services than the storage processor 704. For example, the upper-level processor 700 establishes a set of storage devices 104-114 (or portions thereof) that constitute a RAID, and the upper-level processor sends information to the storage processor 600 to identify these mirror "sides," as well as the virtual device that is to be made visible to the initiators 100.

The controller 714 implements one or more of the protocol levels shown being performed by the target 300 (FIG. 3). For example, the storage processor 704 can implement the link layer, the TCP/IP layer, the iSCSI layer and/or the SCSI layer, or portions thereof. In one example, the storage processor 704 implements the lower protocol layers (link through TCP/IP) and a portion of the iSCSI and SCSI layers. In this example, the storage processor 704 handles SCSI write operations, and it passes other SCSI operations to the storage appliances 602, the upper-level processor 700 or another component for processing. For example the upper level processor 700 can establish logical unit members (LUNs) used by the initiators 100 to issue I/O commands to the virtual devices.

The storage processor 704 can be implemented as an Application Specific Integrated Circuit (ASIC) that includes one or more CPUs for the controller 714, media access control (MAC) circuits for the front-end ports 708 and the back-end ports 710 and memory 716. The memory can be random access memory (RAM), read-only memory (ROM), flash memory or any other memory suitable for storing the instructions and data described herein or combinations of memory types. The ASIC can also include logic, hardware and/or firmware to implement the functions described herein, including the protocol layers (or portions thereof) implemented in the storage processor 704.

Alternatively, the storage processor 704 can be implemented as a set of separate components, such as individual integrated circuits, dedicated or programmable controllers or general purpose processors or computers or a combination thereof.

Parameter Negotiation

Each protocol defines a basic data unit, segment size, burst size and other parameters. For example, according to iSCSI, the basic data unit is a PDU; according to Fibre channel (FC), the basic data unit is an Information Unit (IU); and according to Serial Attached SCSI (SAS), the basic data unit is a frame. To minimize the amount of buffering performed by the storage processor 704, the storage processor intercepts and handles commands and data on a per-basic data unit basis. As previously noted, various storage devices 104-114 can operate according to various parameters, such as maximum segment size and maximum burst size. Values for these and other parameters are typically negotiated or otherwise set between initiators and targets. For example, according to the iSCSI protocol, such parameters are negotiated between initiators and targets during a "login phase." During such a parameter negotiation, one party proposes a parameter value, and the other party responds by accepting the proposed parameter value, rejecting the proposed parameter value or proposing a different value for the parameter.

Some protocols use other methods to set parameters. For example, FC defines a port login procedure (PLOGI), during which operational parameters can be exchanged. A Disconnect-Reconnect Mode Page can also be used to set parameters, as can other methods that are well known in the art.

The upper-level processor 700 (or, alternatively, the storage processor 704) negotiates a set of parameters with the initiators 100 and the simplified storage appliances 602 or the storage devices 104-114 (collectively hereinafter referred to as targets), on which the virtual device is to be implemented. These targets can include, for example, all the storage devices of a RAID-1. Values for these parameters are negotiated, so that all basic data-units sent by the initiators 100 are acceptable to all of the targets. Thus, the storage processor 704 need not receive and buffer all the data of an I/O operation before the storage processor begins writing the data to the targets. In particular, the storage processor 704 needs to buffer only a current basic data unit.

The disclosed apparatus and methods are applicable to systems that use iSCSI, FC, SAS or other potocol to communicate between the initiators 100 (FIG. 6) and the target 706 (FIG. 7) in the storage processor 704, i.e., in the "front end." The disclosed apparatus and methods are also applicable to systems that use iSCSI, FC, SAS or another protocol to communicate between the initiator 710 and the storage appliances 602 or storage devices 104-114, i.e., in the "back end." In the following example, iSCSI is used in both the front end and in the back end of a storage system. However, the front-end protocol need not be the same as the back-end protocol.

The negotiated iSCSI parameters (relevant to this invention) and their values are listed in Table 1. Equivalent FC and SAS parameters are discussed below. Other iSCSI concepts, such as "tasks," have equivalent or similar concepts in other protocols, as is well known in the art. Optionally, additional iSCSI parameters (not relevant to this invention) are negotiated with the initiators 100 and/or with the targets.

TABLE 1 iSCSI Login Parameters Negotiated by Storage Processor

| Name | Value |
| --- | --- |
| DataPDUInOrder | Yes |
| DataSequenceInOrder | Yes |
| ImmediateData | No |
| FirstBurstLength | N/A, because ImmediateData is "No" |
| InitialR2T | Yes |
| ErrorRecoveryLevel | 0 |
| MaxOutstandingR2T | Depends on value proposed by initiator |
| MaxBurstLength | Depends on actual targets involved |
| MaxRecvDataSegmentLength | Depends on actual targets involved |

Figure 8:
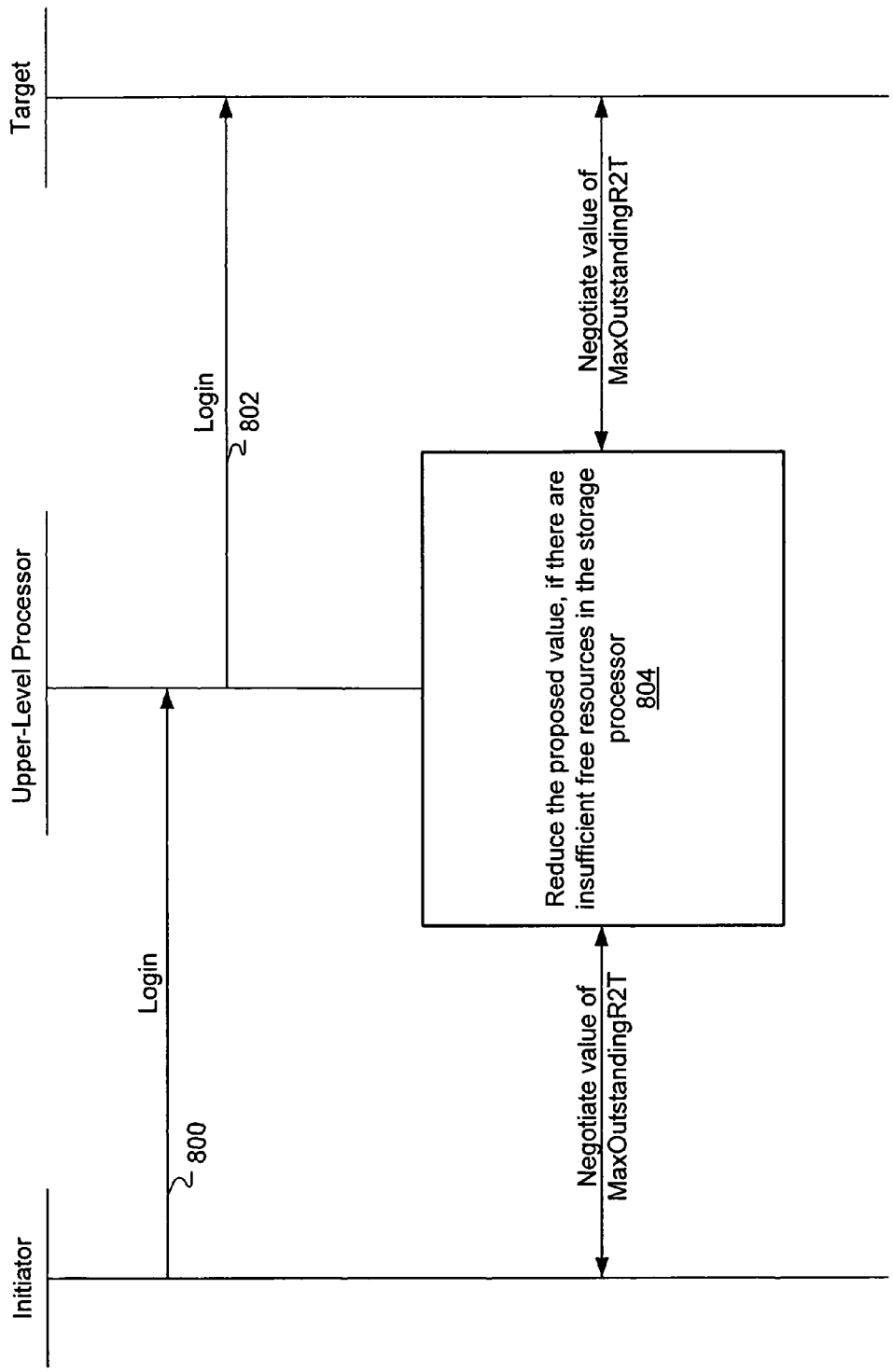
FIG. 8 is a diagram illustrating interactions among an initiator, an upper-level processor of a storage processor complex and a target (such as those shown in FIG. 6) during a portion of a login sequence, according to one embodiment of the present invention.

An example of a portion of the parameter negotiation is illustrated in the ladder diagram of FIG. 8. When the initiator sends a login message 800 to the upper-level processor, and a login succeeds, an iSCSI "session" is established between the initiator and the storage processor complex. Similarly, when the upper-level processor successfully logs 802 into each of the targets that implement the virtual device, an iSCSI session is established between the storage processor complex and the respective target.

As noted earlier, plural R2Ts can be simultaneously outstanding for a single SCSI command. During the login phase, the initiator proposes a value for the parameter MaxOutstandingR2T to the storage processor complex. This parameter represents the maximum number of outstanding R2Ts per task. A "task" is a request, such as a SCSI write command, for which a response is expected. As noted, a SCSI write command can precipitate several data PDUs. An R2T is considered outstanding until the last data PDU (i.e., a data PDU with the final or "F" bit set to 1) is transferred, or a sequence reception timeout occurs.

The upper-level processor receives the proposed value for the MaxOutstandingR2T parameter from the initiator. The upper-level processor optionally reduces the received value 804, if the storage processor contains insufficient free resources, such as memory, to support the proposed value for the parameter. Alternatively, the upper-level processor initially proposes a value for the parameter to the initiator. In either case, the upper-level processor completes the negotiation with the initiator. Similarly, the upper-level processor negotiates a value for the MaxOutstandingR2T parameter with each target, according to the iSCSI protocol. The upper-level processor stores the negotiated values for the initiator and each of the targets in data structures, which are described below with reference to FIGS. 13-17.

In one embodiment, the upper-level processor negotiates the parameter independently with the initiator and each target. These negotiations can occur simultaneously or sequentially. The upper-level processor can complete negotiations with the initiator before starting negotiations with the targets, or visa-versa. Thus, a parameter value can be negotiated with one or more of the targets that is larger than the value negotiated with the initiator. As will be shown below, this is of no consequence, because, if the storage processor receives more R2Ts than it can send to the initiator, the storage processor records information about each of the received R2Ts in the data structures, but the storage processor refrains from sending more R2Ts to the initiator than it has negotiated to send to the initiator.

In another embodiment, the upper-level processor receives a proposed value for the parameter from the initiator and, if necessary, reduces the received proposed value, as described above. Alternatively, the upper-level processor initially proposes a value to the initiator. However, in this embodiment, the upper-level processor does not yet complete the negotiation with the initiator. Instead, the upper-level processor proposes the (possibly reduced) value for the MaxOutstandingR2T parameter to the targets and completes negotiating values for this parameter with the targets. Once a value for the MaxOutstandingR2T parameter has been negotiated with the targets, the upper-level processor resumes negotiating the value for the MaxOutstandingR2T parameter with the initiator. In this embodiment, the storage processor uses the parameter value negotiated with the targets as the maximum acceptable value for the MaxOutstandingR2T parameter in the storage processor's resumed negotiation with the initiator.

The remaining numerical parameters are similarly negotiated, except the MaxBurstLength and MaxRecvDataSegmentLength parameters are typically initially proposed by the target, rather than by the initiator. Alternatively, any of these parameters can be initially proposed by the initiator or by the target.

If the front-end protocol is different than the back-end protocol, the storage processor negotiates equivalent or similar parameters with the initiator and with the target, respectively. For example, if the front-end protocol is iSCSI and the back-end protocol is FC, the storage processor can negotiate MaxBurstLength with an initiator, and the storage processor can negotiate Maximum Burst Length with a target. Equivalent iSCSI, FC and SAS parameters are listed in Table 2.

TABLE 2 iSCSI, FC and SAS Parameter Equivalents

| iSCSI | FC | SAS |
|---|---|---|
| DataPDUInOrder | Sequential Delivery | N/A |
| DataSequenceInOrder | Continuously Increasing Relative Offset Sequence Count | N/A |
| ImmediateData | (Not specified) | (Not specified) |
| FirstBurstLength | N/A | N/A |
| InitialR2T | WRITE_FCP_XFER_RDY | (Not specified) |
| ErrorRecoveryLevel | (Not specified) | (Not specified) |
| MaxOutstandingR2T | N/A | N/A |
| MaxBurstLength | (Not specified; implicitly depends on target parameters) | |
| MaxRecvDataSegmentLength | (Not specified; implicitly depends on target and I/O size) | |

As noted, when using the FC or SAS protocol, only one I/O command can be outstanding at a time. Thus, no FC or SAS parameter corresponds to the iSCSI parameter MaxOutstandingR2T. In addition, when FC or SAS is used with iSCSI (for example, if the front-end protocol is iSCSI and the back-end protocol is FC), the iSCSI parameter MaxOutstandingR2T is negotiated to be 1.

In some cases, the storage processor negotiates some parameters with the initiator, without negotiating corresponding parameters with the target, or visa-versa. For example, the storage processor negotiates "Continuously Increasing Relative Offset" with an FC -connected initiator or target, but the storage processor does not negotiate a corresponding parameter with an iSCSI connected initiator or target. In some cases, a negotiated parameter in one protocol has no equivalent parameter in another protocol.

In FC, Random Relative Offset are negotiated to be "No." Data transfers in SAS are assumed to be sequential.

Once these parameters are negotiated or otherwise set, the storage processor can intercept and handle commands and data on a per-PDU (or other basic data unit) basis, without buffering all the data of an I/O operation. Furthermore, each data PDU the storage processor receives from an initiator will be acceptable to any of the storage devices.

Parameter negotiations can occur at any time. Thus, for example, if additional storage devices are later brought online, i.e., while the storage system is in operation, or additional virtual storage devices are created, the upper-level processor negotiates parameter values with the new targets and/or initiators, as needed. Furthermore, parameter values can be dynamically re-negotiated between the storage processor complex and initiators and/or targets.

Command and Data PDU Processing

Figure 9:
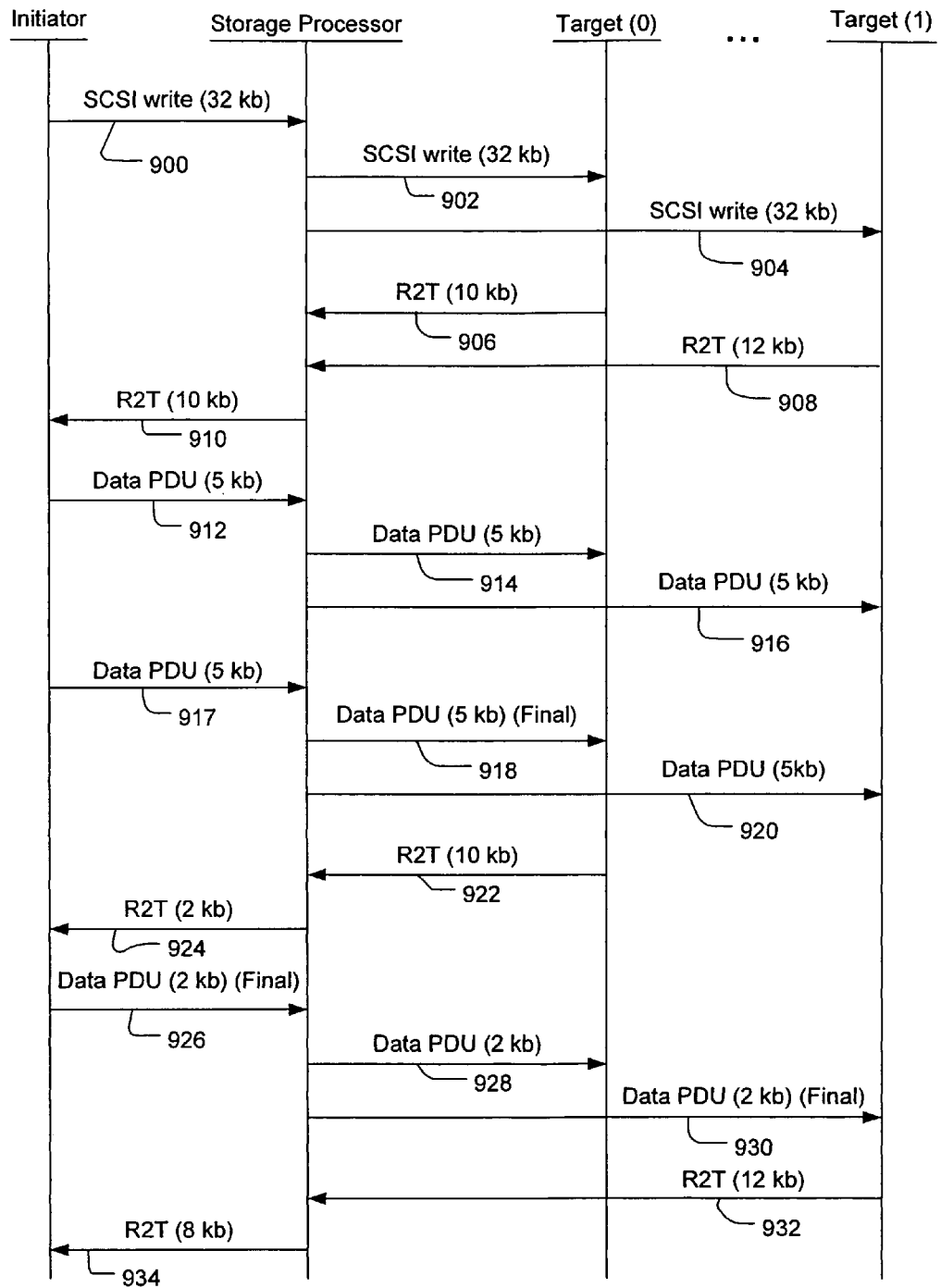
FIG. 9 is a ladder diagram illustrating interactions among an initiator, a storage processor complex and targets (such as those shown in FIG. 6) during a SCSI write operation.

As shown in FIG. 9, when an initiator sends a SCSI command (such as a write command 900) to the virtual device implemented by the storage processor, the storage processor issues one or more SCSI write commands 902 and 904 to the target(s) (i.e., to the storage appliances 602 or the storage devices 104-114 of FIG. 6) that implement the virtual device. The example of FIG. 9 shows a SCSI write command 900 for 32 KB of data. The example shows two targets, however other numbers of targets and other write command sizes are, of course, possible. Each target responds to its respective iSCSI write command 902 or 904 with a respective R2T 906 or 908. If the two R2Ts 906 and 908 specify different transfer lengths (in this example 10 KB and 12 KB, respectively), the storage processor chooses the smaller transfer length. In addition, if the storage processor lacks sufficient memory or other resources, to handle the smaller transfer length (or simply to limit the amount of memory used to handle the transfer) the storage processor further reduces the transfer length. The storage processor sends an R2T 910 to the initiator specifying the (possibly reduced) smaller transfer length (10 KB).

The initiator begins sending data PDUs to the storage processor to satisfy the 10 KB of data requested by the R2T 910. Assume the first data PDU 912 contains 5 KB of data. The storage processor receives the data and buffers the received data in the memory 716 (FIG. 7) of the storage processor. After receiving the data PDU 912, the storage processor forwards the data via data PDUs 914 and 916 to the respective targets. The storage processor can, but need not, wait until it receives all of the data of the PDU 912 before the storage processor begins forwarding the data to the targets. Once all other data of the PDU 912 has been forwarded to all the targets, the memory used to buffer the data can be reused.

As subsequent data PDUs arrive at the storage processor from the initiator, the storage processor forwards the data in the PDUs to the targets. For example, when data PDU 917 arrives at the storage processor, the storage processor forwards the data via data PDUs 918 and 920 to the targets. Because Target 0 requested 10 KB in its R2T 906, that R2T 906 is now satisfied, so the storage processor marks the data PDU 918 to Target 0 as "final." However, because Target 1 requested more than 10 KB in its R2T 908, the data PDU 920 to Target 1 is not marked final.

Because the data PDU 918 satisfied Target 0's R2T 906, when Target 0 is ready to receive additional data, Target 0 sends a subsequent R2T 922 to the storage processor. When the storage processor receives this R2T 922, the storage processor sends an R2T 924 to the initiator. Until the storage processor receives the R2T 922 from Target 0, the storage processor does not request additional data from the initiator, because Target 0 has not indicated an ability to receive any more data. The storage processor does not request data from the initiator unless the storage processor can forward the data to all the targets. Thus, the storage processor need not buffer more data than is in a current data PDU.

Although Target 0 indicates in its R2T 922 that it is prepared to receive another 10 KB of data, the outstanding R2T 908 from Target 1 has only 2 KB of unsatisfied data, and no other R2Ts have been received from Target 1. Thus, the storage processor requests only 2 KB of data in the R2T 924 to the initiator. In other words, the storage processor requests only as much data from the initiator as the storage processor can deliver to the targets. If, on the other hand, another R2T (not shown) had been received from Target 1, or plural simultaneous R2Ts were outstanding from Target 1, the storage processor would have requested more data from the initiator in the R2T 924. For each target, the storage processor uses data structures to keep track of how much data the target has requested and how much data has been sent to the target, as described below with respect to FIGS. 13-17.

When the storage processor receives a data PDU 926 containing 2 KB of data from the initiator, the storage processor forwards the data via data PDUs 928 and 930 to the targets. The data PDU 930 satisfies Target 1's R2T 908, thus the data PDU 930 is marked final.

When Target 1 is ready to receive additional data, Target 1 sends an R2T 932 to the storage processor. When the storage processor receives the R2T 932, the storage processor sends an R2T 934 to the initiator requesting 8 KB of data. The 8 KB represents the smallest amount of unsatisfied data in the outstanding R2Ts from any target. In this example, the R2T 922 from Target 0 requested 10 KB, 2 KB of which were satisfied by data PDU 928, leaving 8 KB of unsatisfied data.

This process continues until the entire SCSI write command 900 is completed, i.e., 32 KB of data have been transferred from the initiator, through the storage processor, to each of the targets. After the storage processor receives response PDUs (not shown) from all the targets, the storage processor sends a response PDU (not shown) to the initiator to complete the SCSI command.

The preceding example scenario assumes one R2T is outstanding at a time from each target. If multiple R2Ts are simultaneously outstanding from one or more of the targets, the storage processor 704 keeps track of each R2T and sends data PDUs to the respective targets, to the extent permitted by the parameters negotiated with the respective targets. Similarly, if a MaxOutstandingR2T parameter value greater than one has been negotiated with the initiator, the storage processor sends R2Ts to the initiator to request multiple data streams, to the extent that data has been requested by the targets and to the extent the storage processor can forward data received from the initiator without buffering more than one data PDU.

Figure 10:
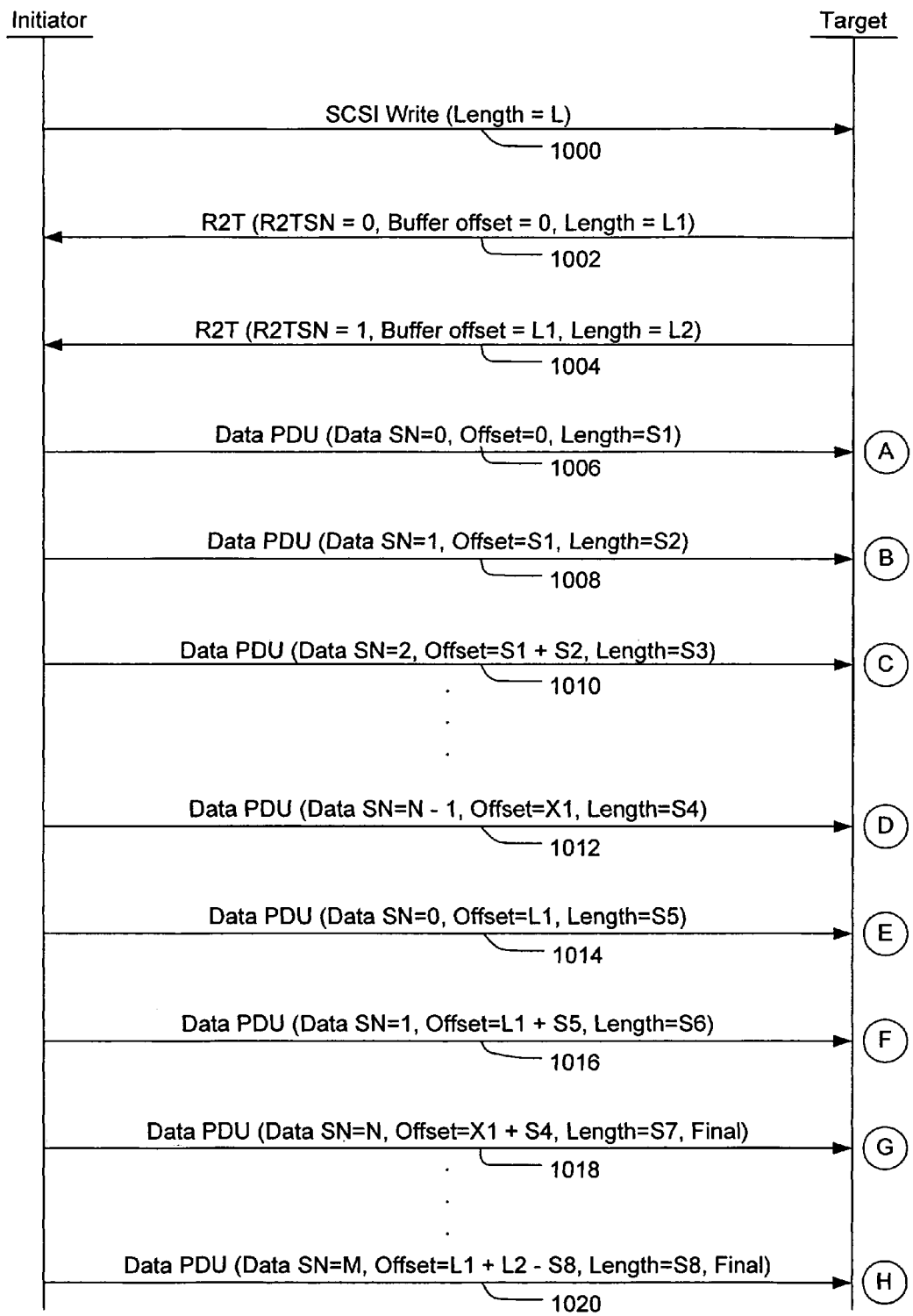
FIG. 10 is another ladder diagram illustrating interactions between an initiator and a target during a SCSI write operation.
Figure 11:
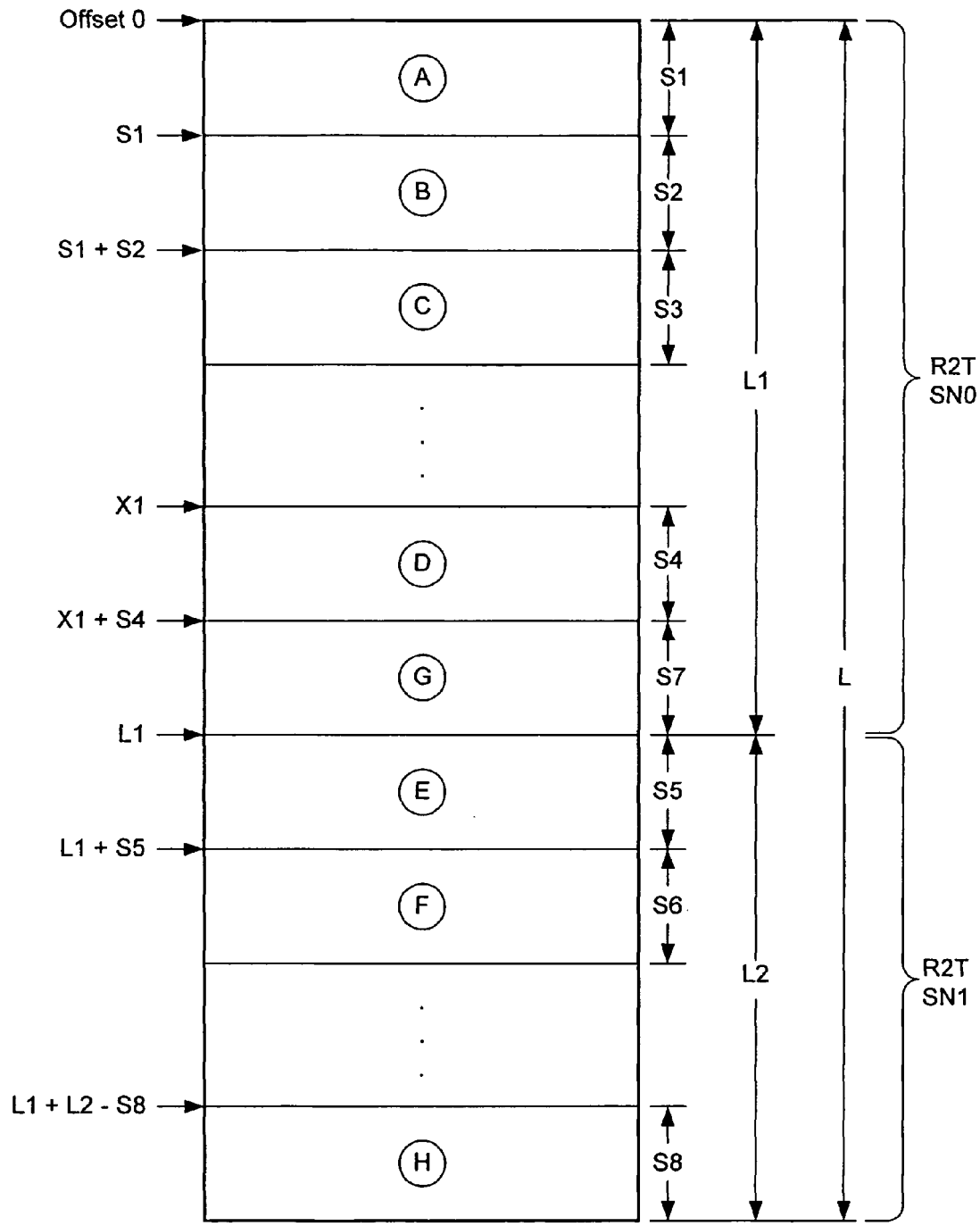
FIG. 11 is a block diagram of a data buffer transferred as a result of the interactions of FIG. 10.

FIG. 10 is a ladder diagram illustrating an example scenario in which a target issues two simultaneously outstanding R2Ts. FIG. 11 is a block diagram of the data buffer transferred by the scenario of FIG. 10. An initiator sends a SCSI write command 1000 to the target. The write command 1000 specifies a transfer length of L. The target sends two R2Ts 1002 and 1004 to the initiator. The first R2T 1002 has an R2T sequence number (R2TSN) equal to 0. This R2T 1002 requests data that begins at offset 0 in the data buffer, and the R2T specifies a transfer length of L1 bytes. The second R2T 1004 has an R2TSN equal to 1. The second R2T 1004 requests a data transfer of L2 bytes, beginning at offset L1 in the data buffer.

The initiator responds to the R2Ts 1002 and 1004 by sending a series of data PDUs. A subset 1004-1020 of this series of PDUs is shown in FIG. 10. Each data PDU 1004-1020 in FIG. 10 is labeled with a circled letter A-H, and a portion of the data buffer that is transferred by each of the data PDUs 1004-1020 is labeled in FIG. 11 with the corresponding circled letter A-H. For each of the portions of the data buffer A-H, FIG. 11 shows the offset from the beginning of the data buffer to the beginning of the portion, as well as the length of the portion.

Each data PDU 1006-1020 includes a data sequence number (DataSN) that identifies the data PDU within the series of data PDUs the initiator sends in response to a particular R2T. Each data PDU 1006-1020 also includes an offset, which indicates where within the data buffer the data PDU's data begins. Each data PDU 1006-1020 also includes a length. For example, data PDU 1006 has a DataSN of 0, indicating that it is the first data PDU in its series. The data PDU 1006 includes an offset of 0, indicating that its data begins at offset 0 within the data buffer. The data PDU 1006 includes a length S1, which specifies the number of bytes transferred in the data PDU.

The next data PDU 1008 has an offset of S1, indicating that its data begins in the data buffer immediately following the data transferred by the preceding data PDU 1006. Succeeding data PDUs transfer succeeding portions of the data buffer. The last data PDU 1018 and 1020 of each R2T 1002 and 1004, respectively, is marked "final."

Simplified Storage Appliance

Figures 12, 13:
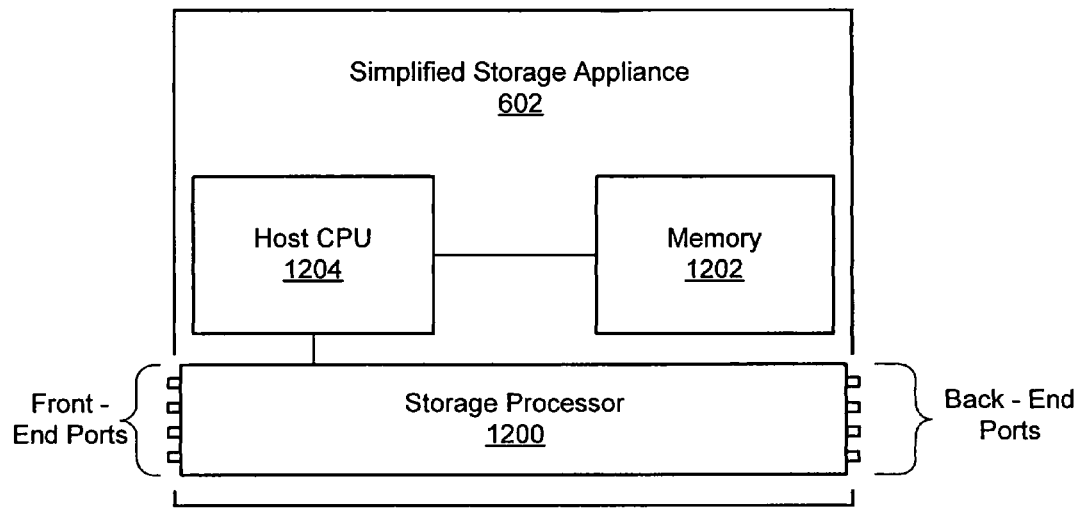
FIG. 12 is a block diagram of a simplified storage appliance of FIG. 6.
FIG. 13 is a diagram of a Mapping Table maintained by the storage processor complex of FIGS. 6 and 7, according to one embodiment of the present invention.

Because the storage processor complex negotiates parameters that ensure that each data PDU the storage processor receives from an initiator is acceptable to any of the storage devices, storage appliances that control the storage devices need not (but, optionally, can) buffer all the data for a SCSI write operation. In particular, the movement of data to and from the memory 210 (FIG. 2) that was discussed above can be avoided. Thus, the storage appliance 118 of FIG. 2 can be simplified. FIG. 12 is a block diagram of a simplified storage appliance 602. Since the simplified storage appliance 602 is not required to buffer all the data of a SCSI write operation, a storage processor 1200 can include enough memory to buffer the data on a per-PDU basis. Consequently, less memory 1202 is required in the simplified storage appliance 602, and fewer demands are placed on the host CPU 1204. In this embodiment, the host CPU 1204 and the memory 1202 or another processor and/or memory (not shown) are the upper-level processor and the memory, respectively, for the storage processor 1200.

FIG. 19 is a block diagram of another embodiment of a storage appliance. In this embodiment, three "blade" processors 1900, 1902 and 1904 are interconnected by a backplane 1906. Blade processors include processors (such as CPUs), memory and optionally other components, such as network interfaces, as is well known. The processors of these blades typically execute software stored in the respective memories to perform desired functions. Other blade processors (not shown) can also be connected to the backplane 1906. Each blade 1900-1904 is typically separately connectable to, and removable from, the backplane 1906, such as to facilitate replacing a failed blade. A host CPU 1908 executes software stored in one or more memories 1910 to control and oversee operation of the blade processors 1900-1904.

The first blade processor 1900 implements one or more targets, which include front-end ports 1912, with which initiators (not shown) can transparently communicate. In one embodiment, each of the front-end ports 1912 has one or more IP addresses, as discussed above with reference to FIG. 7. The first blade processor 1900 includes a TCP/IP protocol stack and an iSCSI protocol stack to facilitate communications with the initiators. Through these communications, the first blade processor 1900 receives iSCSI PDUs from the initiators. Each of these PDUs includes information describing an I/O operation requested by an initiator.

For example, the PDU includes a logical unit number (LUN), which identifies a device to or from which the I/O is directed. Optionally, the LUN can also be used to determine the kind of processing that is to be performed by the storage appliance, for example as discussed below, with respect to FIG. 13.

The PDU also includes a starting block number (typically stated as a logical block address (LBA)) on the device, where the I/O operation is to begin, as well as a size of the I/O operation (typically stated as a number of blocks). The first blade processor 1900 parses the PDU and passes information, such as the LUN, etc., about the requested I/O operation to the second blade processor 1902.

Typically, file-based I/O requests from the initiators are forwarded by the first blade processor 1900 to the second blade processor 1902. In one embodiment, the second blade processor 1902 executes software that implements a LUN as a file in a file system. This implementation "virtualizes" the LUNs. That is, a LUN does not necessarily correspond to one physical device. Instead, I/O requests directed to the LUN are redirected to a file, which can be stored on one or more physical devices (volumes). This redirection is transparent to the initiator. Exemplary software that performs such a virtualization is WAFL® (Write Anywhere File Layout) software, available from Network Appliance, Inc. of Sunnyvale, Calif.

The WAFL software converts I/O requests directed to LUNs into I/O requests directed to the appropriate files on the appropriate devices. For each I/O request, the WAFL software uses information, such as the LUN, starting block number (i.e., the LBA) and amount of data to be transferred (i.e., the number of blocks), passed by the first blade processor 1900 to calculate the LUN of the implementing file, (the "container file") as well as the starting block number and number of blocks on the container file where the data is to be written or read. The second blade processor 1902 sends a PDU containing this calculated information to the third blade processor 1904.

In one embodiment, the third blade processor 1904 implements a redundant storage system, such as a RAID-1 synchronous mirroring system. Other redundant storage systems, such as RAID-5, are also possible, as is well known in the art. The third blade processor 1904 accepts I/O requests directed to LUNs and writes to, or reads from, one or more physical storage devices to satisfy these I/O requests. For example, if the third blade processor 1904 receives a request to write data, the processor writes the data redundantly on several physical storage devices. If the blade processor 1904 receives a read request, the processor satisfies the request by reading the requested data from any of the redundant storage devices that store the requested data. If one or more of the redundant storage devices fail, the third blade processor 1904 uses data stored on the surviving storage devices to reconstruct the requested data and provide the reconstructed data to the requestor.

The hardware architectures of the three blade processors 1900-1904 can, but need not, be identical to each other, although the control software that is executed by each of the blade processors is typically different for each of the blade processors. For example, the third blade processor 1904 can include the storage processor 1905 or storage processor complex disclosed herein. The storage processor or storage processor complex can be implemented as a separate component, or its functions can be integrated with some or all of the other functions performed by hardware and/or software of the third blade processor 1904.

Although typically file-based I/O requests are forwarded by the first blade processor 1900 to the second blade processor 1902, other types of I/O requests, such as block-based requests from the initiators, can be forwarded by the first blade processor 1900 directly to the third blade processor 1904 or directly to the storage processor 1905 or storage processor complex in the third blade processor 1904, thereby bypassing the file system processing that would be otherwise provided by the second blade processor 1902.

Although the storage appliance of FIG. 19 is described as having three functionally different blade processors 1900-1905, the functions described above can be distributed differently among the blade processors or among a different number of blade processors. For example, the functions of blade processors 1902 and 1904 can be combined in a single blade processor.

Network Element

Figure 18:
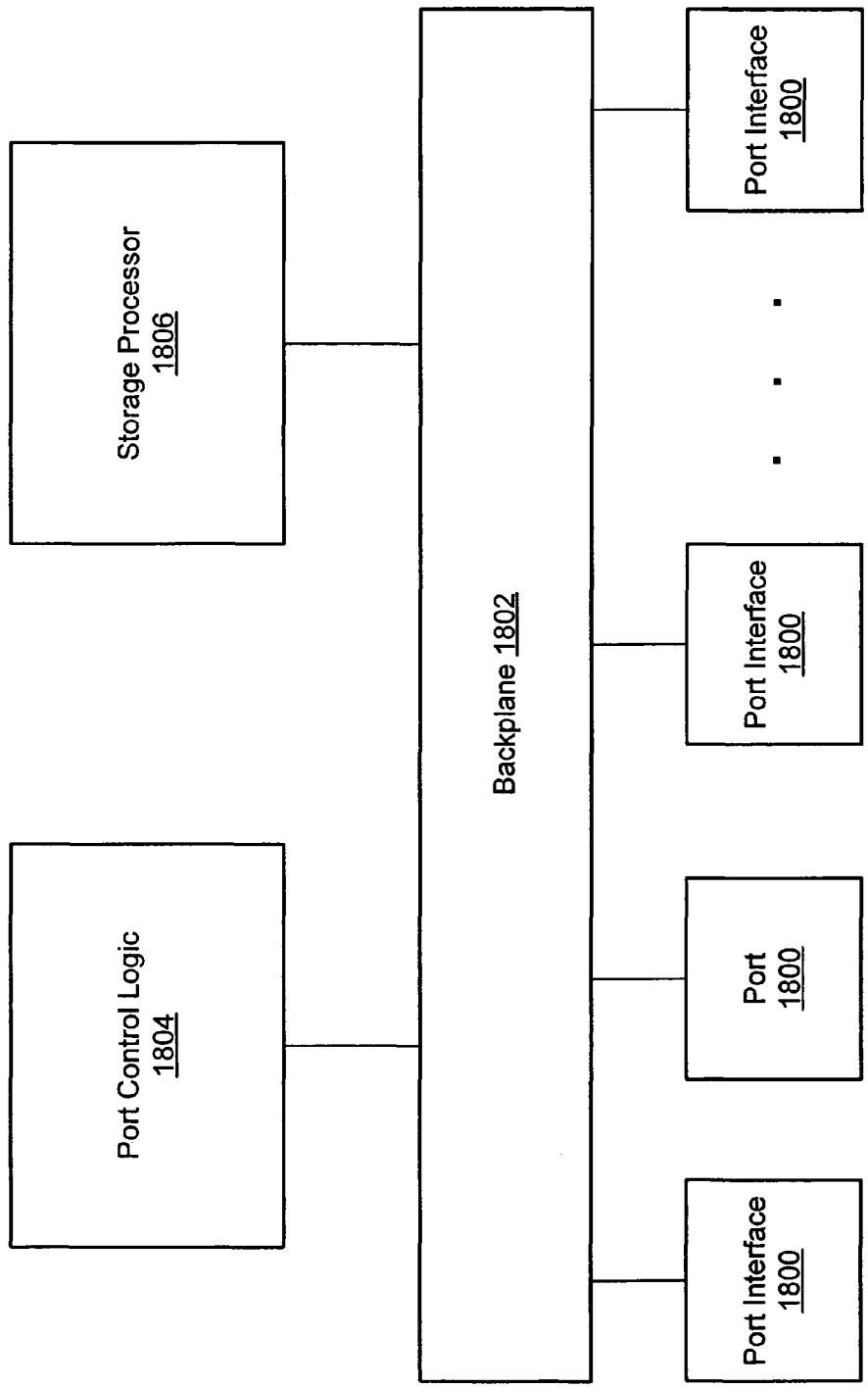
FIG. 18 is a block diagram of a switch, according to one embodiment of the present invention.

As noted, the storage processor complex can reside in a packet-switched network element, such as a switch or router. Such a network element can virtualize a set of iSCSI, FC, SAS or other back-end devices and present a set of LUNs to initiators over iSCSI or other front-end connections in a manner that is functionally equivalent to the blade processor described above with reference to FIG. 19. One embodiment of such a switch is shown in FIG. 18. A plurality of port interfaces 1800 are interconnected via a backplane 1802 to conventional port control logic 1804. In addition, a storage processor 1806 is connected to the backplane 1802. The port control logic 1804 routes network traffic arriving on one of the port interfaces 1800 to an appropriate one or more of the port interfaces 1800, as is well known in the art, or to the storage processor 1806. In addition, the port control logic 1804 routes network traffic issued by the storage processor 1806 to the appropriate port interface(s) 1800.

In one embodiment, the storage processor 1806 includes its own processor and memory resources. Alternatively, the port control logic 1804 and the storage processor 1806 can be implemented by a common processor and/or memory, or the port control logic and the storage processor can share some processor and/or memory resources.

The port control logic 1804 routes at least some network traffic (I/O requests from initiators, status messages from storage appliances or devices, etc.) received by one of the port interfaces 1800 to at least another one of the port interfaces via the storage processor 1806. Alternatively or in addition, the port control logic 1804 routes at least some of this network traffic directly to the storage processor 1806. The storage processor issues network traffic (I/O requests to devices, status messages to initiators, etc.), as needed. The port control logic 1804 routes the network traffic issued by the storage processor 1806 to the appropriate port interface(s) 1800.

The storage processor 1806 implements one or more targets. In one embodiment, each of the ports has one or more IP addresses. The port control logic 1804 and backplane 1802 are configured to forward iSCSI PDUs sent to selected IP addresses to the storage processor 1806. The selected IP address can, for example, be configured through a management workstation (not shown). The storage processor 1806 includes a TCP/IP protocol stack and an iSCSI protocol stack to receive these PDUs and to facilitate communications with initiators. The storage processor 1806 also implements one or more initiators and performs other functions, as described above.

The storage processor complex can also reside in a router. Such an implementation is similar to the one shown in FIG. 19, however a router typically includes additional resources, such as memory to store routing tables and software to implement routing decisions based on network traffic type, protocol, etc. and the contents of the routing tables, as is well known in the art.

Data Structures

As noted, as the storage processor handles write requests, the storage processor keeps track of how much data each target has requested and how much data has been sent to each target. This information enables the storage processor to request data from the initiator (i.e., to send appropriatelysized R2Ts and an appropriate number of R2Ts to the initiator) at appropriate times. The storage processor maintains a set of data structures to keep track of the virtual storage devices it is presenting to initiators, as well as the actual storage devices on which each virtual storage device is implemented. FIGS. 13-17 illustrate the data structures maintained by the storage processor.

FIG. 13 illustrates a Mapping Table. This table contains an entry for each virtual device provided by the storage processor to an initiator. Each of these virtual devices has a logical unit number (LUN), according to the SCSI protocol. For each LUN, the Mapping Table includes a mapping type field that includes information that characterizes the participating actual storage devices, such as their respective LUNs. This field contains abstracted information about the virtual LUN, such as information about how each virtual device is to be handled. Examples of how a virtual device is handled include: LUN pooling or Logical Block Address (LBA) remapping (RAID-0), synchronous mirroring (RAID-1) or other RAID types, including RAID-DP™ (a proprietary RAID available from Network Appliance, Inc. of Sunnyvale, Calif.).

When an upper-level processor of a storage processor complex (FIG. 7) or a host CPU of a storage appliance (FIGS. 12 and 19) processes an I/O request, the processor or host CPU can extract the LUN specified in the I/O request and search the LUN column of the Mapping Table for the extracted LUN. If a matching LUN is found in the Mapping Table, the Mapping Type field of the matching table entry can be used to determine how the I/O request is to be handled. For example, if the Mapping Type field contains RAID-1, the processor or host CPU implements the I/O request by issuing one or more I/O requests to the appropriate members of the RAID-1 set that virtualizes or implements the specified LUN, for example as described above, with reference to the third blade processor 1904 in FIG. 19.

If this virtual device is implemented on one or more real targets, this field contains information about each target, such as an iSCSI session ID and a connection ID of an iSCSI connection between the storage processor and the respective target. For example, in the case of synchronous mirroring, this field contains information about each mirror side. This information enables the storage processor to issue SCSI commands to the targets. The upper-level processor 700 (FIG. 7) fills in a Mapping Table entry when the upper-level processor establishes a virtual device and the connections to the targets that implement the virtual device.

Figure 14:
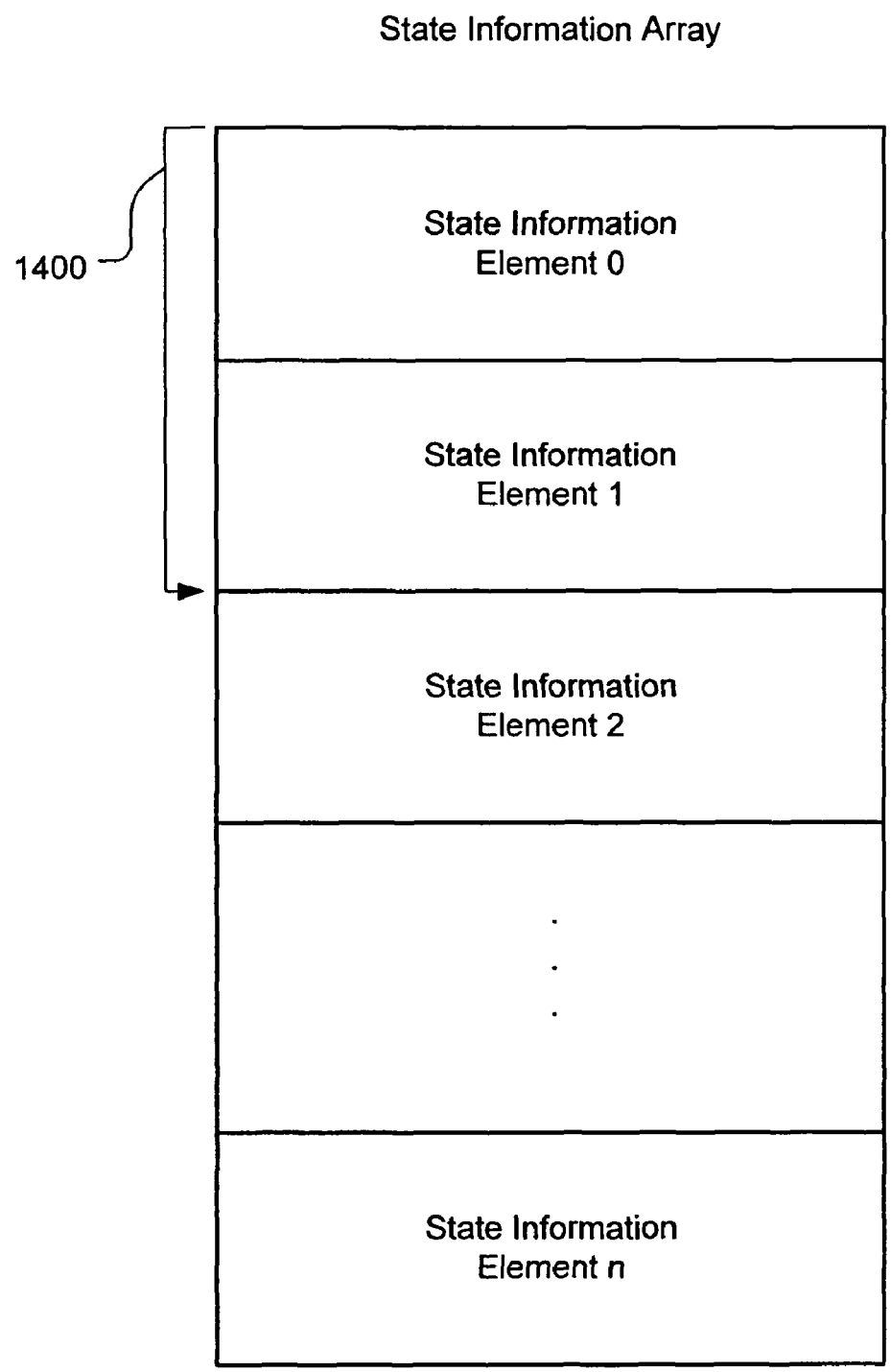
FIG. 14 is a diagram of a State Information array maintained by the storage processor complex of FIGS. 6 and 7, according to one embodiment of the present invention.

FIG. 14 illustrates a State Information array. Each element of this array represents a task (such as a SCSI write command) that the storage processor has received from an initiator or that the storage processor has issued to a target. A task that the storage processor has received from an initiator is referred to as a "target task," and a task that the storage processor has issued to a target is referred to as an "initiator task." The elements of the State Information array are accessed by an index (such as index 1400). This index is referred to as an "initiator task tag" or a "target task tag," as appropriate. Array elements representing initiator tasks and target tasks are intermixed in the State Information array. When the storage processor receives a task from an initiator, or the storage processor issues a task to a target, a new State Information array element is allocated. Once the task is completed, the corresponding element of the State Information array is deallocated.

FIG. 15 is a diagram of one element of the State Information array, i.e., a State Information data structure. As noted, each State Information data structure represents a task. Fields of the data structure include: the session ID and connection ID of the iSCSI connection between the storage processor and the initiator or target; a command sequence number, so the storage processor can handle the tasks in the order in which they were initiated; the command descriptor block (CDB) and LUN of the current task; flags, such as whether this State Information array element represents an initiator task or a target task; the type ("Virtual Type") of the virtual device being presented to an initiator, i.e., RAID-1, etc.; the amount of data transferred thus far in the execution of the task; and the number of pending R2Ts in this task.

Figure 16:
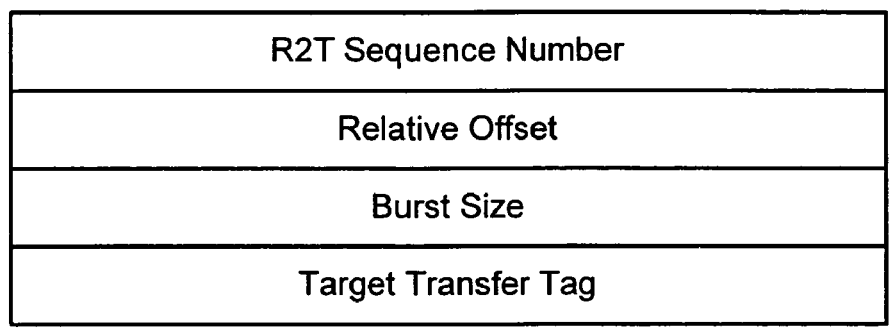
FIG. 16 is a diagram of an R2T Information data structure of the State Information data structure of FIG. 15.

The State Information data structure also includes an array of "R2T Information" elements. For each outstanding R2T the storage processor has received from an initiator or has issued to a target, the storage processor allocates one of these R2T Information elements. The layout of an R2T Information element is shown in FIG. 16. The R2T Information element enables the storage processor to ascertain the amount of data that is to be transferred in response to the corresponding R2T.

Figure 17:
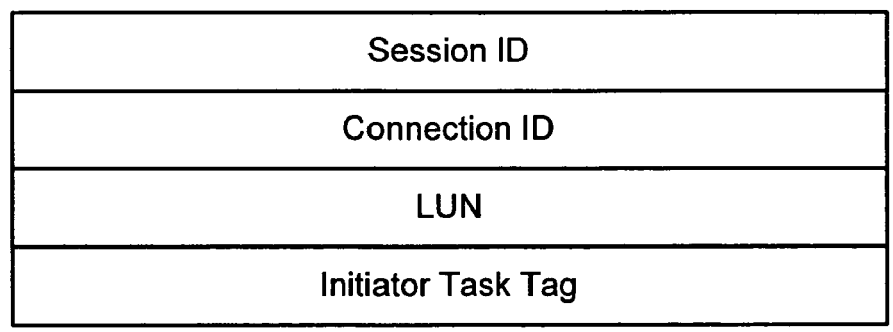
FIG. 17 is a diagram of a Mirror Command Information data structure of the State Information data structure of FIG. 15.

The State Information data structure also includes an array of "Mirror Command Information" elements. A State Information data structure that represents a virtual storage device that is mirrored, or is otherwise implemented on a set of targets, contains a Mirror Command Information element for each of the targets. The layout of a Mirror Command Information element is shown in FIG. 17. The Initiator Task Tag is an index (such as index 1400 in FIG. 14) to the State Information data structure that represents the back-end task (i.e., the task to the target) that is associated with the current front-end task (i.e., the task from the initiator).

An exemplary storage processor that provides iSCSI interfaces to both the initiators and to the targets, has been described. However, as noted these interfaces can be provided using other protocols. In addition, the interface to the initiators need not be according to the same protocol as the interface to the targets. Furthermore, not all the interfaces to all the targets need to be according to one protocol. In other words, one of more targets can use one protocol, while one or more other targets use a different protocol or a set of protocols. For example, an iSCSI interface can be provided to the initiators, and a Fibre Channel interface can be provided to the targets. Other protocols can be used for either interface, as would be understood by one of ordinary skill in the art. Similarly, not all the initiators need to use a common protocol to communicate with the storage processor.

As discussed with respect to FIGS. 1 and 2, the storage appliances 118 include host bus adapters 200 and 204 or other network or fabric interfaces. In some embodiments, these interfaces convert (translate) messages (packets, etc.) received over the IP network 116 or over the Internet (not shown) according to a variety of protocols into messages according to a common message format for processing by an operating system or other control software. The interfaces also convert messages from the operating system according to the common message format into messages according to the appropriate protocol for transmission over the IP network 116 or the Internet. An exemplary operating system is Data ONTAP™, available from Network Appliance, Inc. of Sunnyvale, Calif. However, any suitable operating system that is capable of receiving and translating data from multiple protocols is acceptable.

The interfaces and the storage device 114 (if present) are controlled by the CPUs 208 executing the operating system, control software or other instructions stored in the memory 210 to perform at least some of the functions described herein.

Optionally, the storage processor complex 600, or portions thereof, can be combined with, or included in, a Network Attached Storage (NAS) device, Storage Area Network (SAN) device, NAS/SAN device, storage system, server, gateway or the like. The initiators 100 and other clients may be general-purpose computers configured to execute applications under the control of a variety of operating systems, including the UNIX® and Microsoft® Windows® operating systems. These computers may utilize file-based or block-based access protocols when accessing information in a storage system over a NAS-based or SAN-based network. Therefore, each computer may request the services of the storage system by issuing access protocol messages (in the form of packets) to the storage system over the network. For example, a computer running the Windows operating system may communicate with the storage system using the Common Internet File System (CIFS) protocol over TCP/IP. On the other hand, a computer running the UNIX operating system may communicate with the storage system using the Network File System (NFS) protocol over TCP/IP. In addition, computers running the Windows or UNIX operating system can communicate with storage appliances using iSCSI, FC, SAS or another protocol to transport SCSI or other I/O commands. It will be apparent to those skilled in the art that other computers running other types of operating systems may also communicate with the storage system, also known as a multi-protocol storage appliance, using other file access protocols. As noted, messages received by the storage system according to various protocols from various clients are translated for execution by an operating system of the storage system.

A storage processor has been described as including a processor controlled by instructions stored in a memory. Those skilled in the art should readily appreciate that instructions or programs defining the functions of the present invention can be delivered to a processor in many forms, including, but not limited to, information permanently stored on non-writable storage media (e.g. read only memory devices within a computer such as ROM or CD-ROM disks readable by a computer I/O attachment), information alterably stored on writable storage media (e.g. floppy disks and hard drives) or information conveyed to a computer through communication media. In addition, while the invention can be embodied in an ASIC, the functions necessary to implement the invention can alternatively be embodied in part or in whole using software, firmware and/or hardware components, such as combinatorial logic, Field-Programmable Gate Arrays (FPGAs), general purpose central processors (CPUs), general purpose controllers or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, while some systems are disclosed in the context of RAID-1, other forms of redundant storage, such as RAID-4 and RAID-5, can also be used. Moreover, while the preferred embodiments are described in connection with various illustrative data structures, one skilled in the art will recognize that the system may be embodied using a variety of data structures. Accordingly, the invention should not be viewed as limited, except by the scope and spirit of the appended claims.

What is claimed is:

1. A storage processor, comprising:
a target interface;
an initiator interface; and
a controller connected to the target interface and to the initiator interface to control operations of the respective interfaces, the controller being operative:
to control the target interface to exchange messages with an initiator and to control the initiator interface to exchange messages with at least one target of a plurality of targets, to negotiate one or more operational parameters with the initiator and with the at least one target, the one or more operational parameters indicating at least one data segment size and at least one data burst size acceptable to the at least one target, wherein the at least one target comprises a storage device operable to receive and respond to an input/output command, and wherein a negotiation comprises the initiator proposing a value for the one or more operational parameters and the at least one target proposing a different value for the one or more operational parameters; and
to control the target interface to accept a first input/output command directed to a virtual storage device and to control the initiator interface to issue a corresponding second input/output command to the at least one target, each of the first and second input/output commands conforming to the one or more negotiated operational parameters, wherein the plurality of targets is presented as the virtual storage device, and wherein the controller requests no more data from the initiator than can be transmitted to a target of the plurality of targets that has a smallest outstanding unsatisfied data request;
the target interface being operative to receive, from the initiator, data segments corresponding to the first input/output command; and
the initiator interface being operative to transmit, to the at least one target, each received data segment corresponding to the second input/output command, each received data segment being transmitted to the at least one target as the data segment is received over the target interface, without first buffering in the storage processor, a plurality of received data segments corresponding to the first input/output command.

2. The storage processor of claim 1, wherein the controller is operative to negotiate the one or more operational parameters such that the negotiated one or more operational parameters is acceptable to both the initiator and the at least one target.

3. The storage processor of claim 1, wherein the target interface, the initiator interface and the controller comprise a single application-specific integrated circuit (ASIC).

4. The storage processor of claim 1, wherein the target interface, the initiator interface and the controller comprise combinatorial logic.

5. The storage processor of claim 1, wherein the target interface, the initiator interface and the controller comprise software.

6. The storage processor of claim 1, wherein, the controller is operative, before completing the negotiation of the one or more operational parameters with the initiator and with the at least one target, to reduce the one or more operational parameters if an available amount of a resource within the storage processor is below a predetermined value.

7. The storage processor of claim 1, further comprising a memory and wherein the controller is operative to store information in the memory about the amount of data to be transferred as a result of the first input/output command and the amount of data thus far transmitted to each of the at least one target.

8. The storage processor of claim 1, wherein the target interface is operative to communicate with the initiator according to a first network protocol, and the initiator interface is operative to communicate with the at least one target according to a second network protocol.

9. The storage processor of claim 7, wherein the first network protocol is different than the second network protocol.

10. A method of processing input/output commands, comprising:
negotiating, by a storage processor, one or more operational parameters with an initiator, and negotiating the one or more operational parameters with at least one target of a plurality of targets,
the one or more operational parameters indicating at least one data segment size and at least one data burst size acceptable to the at least one target, wherein the at least one target comprises a storage device operable to receive and respond to an input/output command, and wherein the negotiating comprises the initiator proposing a value for the one or more operational parameters and the at least one target proposing a different value for the one or more operational parameters;
receiving a first input/output command from the initiator;
transmitting a corresponding second input/output command to the at least one target, wherein each of the first and second input/output commands conforms to the one or more negotiated operational parameters;
requesting no more additional data than can be sent to a target of the plurality of targets that has a smallest outstanding unsatisfied data request;
receiving data segments corresponding to the first input/output command from the initiator; and
as each data segment is received, transmitting the received data segment corresponding to the second input/output command to the at least one target, without first buffering in the storage processor, a plurality of the data segments.

11. The method of claim 10, wherein negotiating the one or more operational parameters comprises obtaining a value for the one or more operational parameters that is acceptable to both the initiator and the at least one target.

12. The method of claim 10, further comprising, before completing the negotiating the one or more operational parameters, if an available amount of a resource is below a predetermined value, reducing the one or more operational parameters.

13. A computer storage medium, comprising:
computer instructions operable to control a processor, such that the processor:
negotiates one or more operational parameters with an initiator, and negotiates the one or more operational parameters with at least one target of a plurality of targets, the one or more operational parameters indicating at least one data segment size and at least one data burst size acceptable to the at least one target, wherein the at least one target comprises a storage device operable to receive and respond to an input/output command, and wherein a negotiation comprises the initiator proposing a value for the one or more operational parameters and the at least one target proposing a different value for the one or more operational parameters;
receives a first input/output command from the initiator;
transmits a corresponding second input/output command to the at least one target, wherein each of the first and second input/output commands conforms to the one or more negotiated operational parameters;
requests no more additional data than can be sent to a target of the plurality of targets that has a smallest outstanding unsatisfied data request;
receives data segments corresponding to the first input/output command from the initiator; and
as each data segment is received, transmits the received data segment corresponding to the second input/output command to the at least one target, without first buffering in a storage processor, a plurality of the data segments.

14. The computer storage medium of claim 13, wherein the computer instructions are further operable to control the processor to obtain a value for the one or more operational parameters that is acceptable to both the initiator and the at least one target.

15. A network element, comprising:
a backplane;
a plurality of port interfaces connected to the backplane;
a storage processor; and
port control logic connected to the backplane and operative to route at least some network traffic arriving at the port interfaces to the storage processor,
wherein the storage processor comprises:
a target interface;
an initiator interface; and
a storage processor controller connected to the target interface and to the initiator interface to control operations of the respective interfaces, the storage processor controller being operative:
to control the target interface to exchange messages with an initiator via a first one of the plurality of port interfaces and to control the initiator interface to exchange messages with at least one target of a plurality of targets via a respective second one of the plurality of port interfaces, to negotiate one or more operational parameters with the initiator and with the at least one target, the one or more operational parameters indicating at least one data segment size and at least one data burst size acceptable to the at least one target, wherein the at least one target comprises a storage device operable to receive and respond to an input/output command, and wherein a negotiation comprises the initiator proposing a value for the one or more operational parameters and the at least one target proposing a different value for the one or more operational parameters;
to control the target interface to accept, via the first port interface, a first input/output command directed to a virtual storage device, wherein the plurality of targets is presented as the virtual storage device, and wherein the storage processor controller requests no more data from the initiator than can be transmitted to a target of the plurality of targets that has a smallest outstanding unsatisfied data request; and
to control the initiator interface to issue a corresponding second input/output command to the at least one target via the respective second port interface,
wherein each of the first and second input/output commands conforms to the one or more negotiated operational parameters,
wherein the target interface is operative to receive, via the first port interface, data segments corresponding to the first input/output command, and
wherein the initiator interface is operative to transmit each received data segment corresponding to the second input/output command, each received data segment being transmitted to the at least one target, via the respective second port interface, as the data segment is received over the target interface, without first buffering in the storage processor, a plurality of received data segments corresponding to the first input/output command.

16. The storage processor of claim 15, wherein the storage processor controller is operative to negotiate the one or more operational parameters such that the negotiated one or more operational parameters is acceptable to both the initiator and the at least one target.

17. The storage processor of claim 15, wherein the target interface, the initiator interface and the storage processor controller comprise a single application-specific integrated circuit (ASIC).

18. The storage processor of claim 15, wherein the target interface, the initiator interface and the storage processor controller comprise combinatorial logic.

19. The storage processor of claim 15, wherein the target interface, the initiator interface and the storage processor controller comprise software.

20. The network element of claim 15, wherein the storage processor controller comprises a processor separate from the port control logic.

21. The network element of claim 15, wherein the storage processor controller comprises the port control logic.

22. The storage processor of claim 15, wherein, the storage processor controller is operative, before completing the negotiation of the one or more operational parameters with the initiator and with the at least one target, to reduce the one or more operational parameters if an available amount of a resource within the storage processor is below a predetermined value.

23. The storage processor of claim 15, wherein the storage processor controller further comprises a memory and wherein the storage processor controller is operative to store information in the memory about the amount of data to be transferred as a result of the first input/output command and the amount of data thus far transmitted to each of the at least one target.

24. The storage processor of claim 15, wherein the target interface is operative to communicate with the initiator according to a first network protocol, and the initiator interface is operative to communicate with the at least one target according to a second network protocol.

25. The storage processor of claim 24, wherein the first network protocol is different than the second network protocol.

26. A storage processor, comprising:
a target interface;
an initiator interface; and
a controller connected to the target interface and to the initiator interface to control operations of the respective interfaces, the controller being operative:
to control the target interface to exchange messages with an initiator and to control the initiator interface to exchange messages with at least one target of a plurality of targets, to negotiate two or more of a plurality of operational parameters with the initiator and with the at least one target, the plurality of operational parameters including a first operational parameter indicating a number of outstanding R2Ts (requests to transmit), a second operational parameter indicating a burst size acceptable to the at least one target, and a third operational parameter indicating a data segment size acceptable to the at least one target, wherein the at least one target comprises a storage device operable to receive and respond to an input/output command, wherein a negotiation comprises the initiator proposing values for two or more operational parameters and the at least one target proposing different values for the two or more operational parameters; and
to control the target interface to accept a first input/output command directed to a virtual storage device and to control the initiator interface to issue a corresponding second input/output command to the at least one target, each of the first and second input/output commands conforming to the two or more negotiated operational parameters, wherein the plurality of targets is presented as the virtual storage device, and wherein the controller requests no more data from the initiator than can be transmitted to a target of the plurality of targets that has a smallest outstanding unsatisfied data request;
the target interface being operative to receive, from the initiator, data segments corresponding to the first input/output command; and
the initiator interface being operative to transmit, to the at least one target, each received data segment corresponding to the second input/output command, each received data segment being transmitted to the at least one target as the data segment is received over the target interface, without first buffering in the storage processor, a plurality of received data segments corresponding to the first input/output command.

27. The storage processor of claim 1, wherein the controller compares a size of an outstanding unsatisfied data request for each of the plurality of targets to determine the smallest outstanding unsatisfied data request, wherein the size of the outstanding unsatisfied data request for each target is stored in a data structure.

28. The method of claim 10, wherein the controller compares a size of an outstanding unsatisfied data request for each of the plurality of targets to determine the smallest outstanding unsatisfied data request, wherein the size of the outstanding unsatisfied data request for each target is stored in a data structure.

29. The computer storage medium of claim 13, wherein the controller compares a size of an outstanding unsatisfied data request for each of the plurality of targets to determine the smallest outstanding unsatisfied data request, wherein the size of the outstanding unsatisfied data request for each target is stored in a data structure.

30. The storage processor of claim 15, wherein the controller compares a size of an outstanding unsatisfied data request for each of the plurality of targets to determine the smallest outstanding unsatisfied data request, wherein the size of the outstanding unsatisfied data request for each target is stored in a data structure.

31. The storage processor of claim 26, wherein the controller compares a size of an outstanding unsatisfied data request for each of the plurality of targets to determine the smallest outstanding unsatisfied data request, wherein the size of the outstanding unsatisfied data request for each target is stored in a data structure.

* * * * *